US012486987B2

(12) United States Patent
Yeo et al.

(10) Patent No.: US 12,486,987 B2
(45) Date of Patent: Dec. 2, 2025

(54) APPLIANCE

(71) Applicant: LG ELECTRONICS INC., Seoul (KR)

(72) Inventors: Chan-Yong Yeo, Seoul (KR); Wanglim Lee, Seoul (KR); Janghoon Kim, Seoul (KR); Myeongsu Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 640 days.

(21) Appl. No.: 17/885,390

(22) Filed: Aug. 10, 2022

(65) Prior Publication Data

US 2023/0047660 A1 Feb. 16, 2023

(30) Foreign Application Priority Data

Aug. 11, 2021 (KR) .......................... 10-2021-0106322
Jun. 21, 2022 (KR) .......................... 10-2022-0075287

(51) Int. Cl.
*F24C 7/08* (2006.01)
*F24C 15/02* (2006.01)
*F24C 15/08* (2006.01)

(52) U.S. Cl.
CPC .............. *F24C 7/085* (2013.01); *F24C 15/02* (2013.01); *F24C 15/08* (2013.01)

(58) Field of Classification Search
CPC ........ F24C 15/008; F24C 7/085; F24C 15/02; G01H 1/00; H01H 13/58; H01H 13/38; H01H 13/00; G01P 15/097; A47L 15/4257; A47L 15/4293; A47L 9/28; A47L 5/00; D06F 39/14

USPC ............... 126/19 R, 273 R; 200/61.81, 529; 326/94, 802

See application file for complete search history.

(56) References Cited

U.S. PATENT DOCUMENTS

2018/0112911 A1* 4/2018 Ivanovic ................. F25D 23/02
2019/0120546 A1* 4/2019 Hong .................... F25D 29/005
2019/0316835 A1* 10/2019 Marutani ................ F25D 23/12
2020/0149953 A1* 5/2020 Nagase .................... G01H 1/00

FOREIGN PATENT DOCUMENTS

| CN | 211503400 U | | 9/2020 | |
|---|---|---|---|---|
| CN | 212109183 U | * | 12/2020 | |
| JP | 2018-94416 A | | 6/2018 | |
| KR | 20170055856 A | * | 5/2017 | |
| KR | 10-2019-0001876 A | | 1/2019 | |
| WO | WO-2019066280 A1 | * | 4/2019 | ............ F24C 15/006 |
| WO | 2021/125430 A1 | | 6/2021 | |

OTHER PUBLICATIONS

Chen X, CN-212109183-U (Machine Translation), Dec. 8, 2020.*
Park S, KR-20170055856-A (Machine Translation), May 22, 2017.*
Juhee K, WO-2019066280-A1 (Machine Translation), Apr. 4, 2019.*

* cited by examiner

*Primary Examiner* — Edelmira Bosques
(74) *Attorney, Agent, or Firm* — Bryan Cave Leighton Paisner LLP

(57) ABSTRACT

The present disclosure relates to an appliance having an input switch that receives a knock input at the front of a main body, and a transfer member connecting to the input switch that transfers vibrations caused by the knock to a sensor disposed at the rear of the main body.

19 Claims, 23 Drawing Sheets

Knock

APPLIANCE

CROSS-REFERENCE TO RELATED APPLICATION

This application claims priority to and the benefit of Korean Patent Application No. 10-2021-0106322, filed on Aug. 11, 2021, and Korean Patent Application No. 10-2022-0075287, filed on Jun. 21, 2022, the disclosures of which are incorporated herein by reference in their entirety.

TECHNICAL FIELD

Disclosed herein is an appliance, and specifically, an appliance having a see-through window in a door to allow a user to look into the appliance, preferably an oven or cooking appliance.

BACKGROUND

Appliances such as an appliance, a refrigerator, a clothing management device and the like are widely used, and the appliances are configured to accommodate objects and include one or more doors.

Such appliances include a cabinet forming an exterior, wherein the cabinet forms an accommodation space for accommodating one or more objects, therein. The appliance is provided with one or more doors for opening and closing the accommodation space.

Usually, the doors of such appliances are opaque or untransparent. Accordingly, when the one or more doors are closed, it is impossible to check objects accommodated in the accommodation space. Thus, to check the objects accommodated in the accommodation space, it is necessary to open the one or more doors.

In the case of an appliance such as a refrigerator, an oven and a dryer, cold air or hot air inside the appliance may leak outward if the one or more doors are opened, causing unnecessary energy loss or negative influence on the objects inside the appliance.

In the case of an appliance such as a washing machine, wash water can flow out if the doors are opened. The doors of the washing machine are therefore locked while the washing machine performs a washing operation to prevent the doors from being opened.

Additionally, in some appliances such as an oven, a washing machine, a dryer and the like, a see-through window is applied to their doors. Through the see-through window, the state of an object in the appliance can be checked. A see-through windows comprises at least part of the window being transparent, so that the user may check the state of the inside of the appliance.

Even if the see-through window is mounted on the doors of the appliance, the object in the appliance cannot be properly checked in the dark or at night.

To solve such problems, appliances are provided with a light for lighting up the inside of the appliance accommodating an object as well as a door on which a see-thought window is mounted. Conventionally, the appliances include a manipulation switch for turning on or off the light. Thus, the users can manipulate the manipulation switch and turn on the light, and check the state of the object more clearly through the see-through window.

However, the addition of the manipulation switch for turning on/off the light to an appliance leads to an increase of parts, in particular in the number of manipulation switches provided in the appliance. At this time, a large number of manipulation switches disposed at the appliance can cause deterioration in aesthetic qualities of the entire appliance and are also susceptible to failure.

Additionally, in an appliance including a large number of manipulation switches, the size of the manipulation switches needs to decrease or a distance among the manipulation switches needs to decrease, increasing the possibility of an error in manipulation or deteriorating ease of manipulation.

Further, a large number of manipulations switches make users confusing, and users cannot remember which manipulation switch is used in which situation, making it difficult for them to use the appliance.

Furthermore, users can have difficulty in finding and manipulating a manipulation switch for turning on/off a light in the dark. That is, a light required in the dark for lighten up the inside of the appliance cannot be used due to darkness, if the user is not aware where to find the manipulation switch.

In recent years, appliances, capable of operating a light that lights up their inside only by a knock operation on the door, have been available on the marked.

Such an appliance can perform the operation of lighting up a light inside only based on a knock operation without opening the door or without manipulating a manipulation switch, solving the above-mentioned problems to some degree.

In an appliance, which performs the function of operating a light that lights up the inside of the appliance based on a knock operation (hereafter, a "knock-on function"), a lamp operates, as a sensor senses sound waves generated by a knock input applied to the door.

In the appliance, the sensor for detecting the know can be installed in a limited position only Furthermore, to reliably detect a knock at the door, the medium between door or the location where the knock is applied and the sensor detecting the knock should not dampen the transmission of the knock or the sound waves.

That is, in the appliance, the fewest number of medium should connect the point of a knock and the point of the installation of a sensor such that sound waves caused by a knock reach the sensor, since the homogeneity and continuity of the medium for transferring sound waves need to be maintained.

However, in such an appliance, there are only limited points which can satisfy the conditions that a single medium connects the point of a knock and the point of the installation of a sensor.

That is, in the appliance, the sensor for detecting a knock can be installed in limited positions only.

Additionally, in case of an appliance such as an oven and the like, the inside of a cooking space closed by doors is heated, and high-temperature heat is transferred to the doors and the surrounding area thereof. Thus, when a sensor is disposed at the door to which high-temperature heat is transferred and in the surrounding area of the door, the sensor cannot operate properly or can be broken due to the heat.

Importantly, best would be if homogeneity of a medium could be maintained between the position of the application of a knock and the position of the installation of an acoustic wave sensor in an appliance having the knock-on function.

Furthermore, in such an appliance, vibrations of the appliance itself or vibrations might occur or could be caused by another external force and the like in addition to vibrations caused by a knock.

Thus, the vibrations caused by a knock cannot be distinguished easily from other vibrations, causing an error in sensing a knock.

To solve the problem, in an appliance having the knock-on function, the homogeneity of a medium is maintained between the position of the application of a knock and the position of the installation of an acoustic wave sensor. In the appliance, the acoustic wave sensor for recognizing a knock input is disposed on a front panel.

The damping width of sound waves transferred along different mediums when the homogeneity of the mediums is not maintained is greater than when the homogeneity of the mediums is maintained. Accordingly, the intensity of sound waves generated by an impact applied to another portion of the appliance rather than the front panel is sufficiently dampened.

In the appliance, the damping width of sound waves is used to distinguish sound waves caused by a knock applied to the front panel from sound waves caused by other vibrations of the appliance itself or vibrations induced by external force.

In the appliance, a knock input is sensed in this way, while vibrations, which are not generated on the front panel, are not recognized as a knock, effectively reducing operational errors caused by vibrations of a refrigerator itself or vibrations induced by another external force.

However, since an acoustic wave sensor needs to be attached to the front panel in the appliance, the position of the installation of the sensor is limited. In the prior art, the acoustic wave sensor is used to distinguish a knock signal generated at the front panel from vibrations caused by another factor. However, the acoustic wave sensor can cause the following problems.

That is, the acoustic wave sensor recognizes whether a knock is input, only considering the intensity and pattern of sound waves. Accordingly, the acoustic wave sensor can faulty recognize sound waves, caused by another factor rather than a knock, as a knock.

The acoustic wave sensor senses sound waves without considering the direction of the position where the sound waves are generated. Thus, the acoustic wave sensor cannot determine the position where the sound waves are generated. When the intensity and pattern of sound waves caused by a knock on the door are similar to the intensity and pattern of sound waves caused by another factor in another position rather than the door, the acoustic wave sensor cannot distinguish the two types of sound waves properly. That is, when the intensity and pattern of sound waves caused by another factor in another position rather than the door are similar to the intensity and pattern of the knock, the acoustic wave sensor is highly likely to recognize the sound waves caused by another factor wrongly as the sound waves caused by the knock.

Additionally, in case of an appliance such as an oven and the like where the temperature of a door and the surrounding area thereof is high, a sensor is highly likely to make an operational error or experience damage due to heat transferred to a see-through window when the sensor is installed at the see-through window or close by. This means that the sensor is rarely disposed at the see-through window. When the sensor is disposed in another position rather than the see-through window, a distance between a point of a knock input and the point of the sensor increases, and the performance of sensing a knock deteriorates.

Further, in an appliance, an acoustic wave sensor is disposed at a door while being pressed against the door. The sensitivity of the acoustic wave sensor depends on the degree to which the acoustic wave sensor is pressed against the door. For example, as the acoustic wave sensor is pressed against the door strongly, the sensitivity of the acoustic wave sensor decreases, and as the acoustic wave sensor is pressed against the door weakly, the sensitivity of the acoustic wave sensor increases.

A decrease in the sensitivity of the acoustic wave sensor results in a decrease in the performance of sensing a knock. An excessive increase in the sensitivity of the acoustic wave sensor increases the possibility that the acoustic wave sensor can make a sensing error while responding to surrounding sound waves having low intensity such as sounds made by vibrations of a motor and the like.

In the prior art, an acoustic wave sensor is used to sense a knock input of an appliance rather than a vibration sensor due to difficulty in filtering vibrations caused by noise, as described above. Additionally, in the prior art, since it is difficult to attach a sensor to the door of an appliance such as an oven and the like due to high-temperature heat, the sensor needs to be disposed in another position rather than the door.

However, as a distance between the point of a knock input and the point of an acoustic wave sensor increases, damping in the transfer of sound waves increases, making it difficult to sense the knock input accurately and filter a noise signal.

Furthermore, appliances, which have been launched recently, provide additional advanced functions to ensure ease of use. Thus, manipulation devices for manipulating the additional functions are added to the doors of the appliances.

This means that the design and manufacturing of the doors become more complex and that devices or elements for additional functions need to be disposed in another portion rather than the doors.

Additionally, since the sizes of a see-through window and a display that are mounted on the door tend to increase, the door has not enough space to dispose devices such as sensors, elements, modules and the like for advanced functions. The devices including devices such as a sensor for sensing a knock input need to be disposed in another position rather than the door.

A dishwasher with an acceleration sensor is disclosed in JP 2018-094416). The acceleration sensor can detect the direction and magnitude of acceleration of the movement of a door caused by vibrations added to the door. The acceleration sensor is disposed at the door, and senses vibrations added to the door, to sense a knock on the door.

The dishwasher that senses a knock by using the acceleration sensor can distinguish vibrations caused by a knock very accurately from vibrations caused by another factor in another position rather than the door since the acceleration sensor disposed at the door can detect the direction of acceleration as well as the magnitude of the movement of the door, caused by vibrations added to the door.

That is, the dishwasher can improve the accuracy of sensing a knock operation effectively while reducing the possibility that a knock operation is sensed wrongly.

The acceleration sensor can help to improve the accuracy in the dishwasher's sensing of a knock operation. However, in a high-temperature environment, the acceleration sensor can operate improperly or can be broken, like a vibration sensor or an acoustic wave sensor and the like.

Accordingly, it is difficult to apply the acceleration sensor to the appliance such as an oven and the like where the temperature of a door and the surrounding area thereof is high.

Additionally, when the acceleration sensor is installed in a position far from a door or the surrounding area of the door, the performance of sensing a knock can deteriorate, and a noise signal cannot be filtered properly as a distance between a point of a knock input and the point of the acceleration sensor increases, although the acceleration sensor is not affected by high temperature.

An appliance with an acceleration sensor is disclosed in WO 2021/125430. Therein, a vibration sensor that senses vibrations on the x-axis, y-axis and z-axis is disposed far from a door. Specifically, a sensor assembly including an acceleration sensor is disposed on a side of a cabinet. The sensor assembly includes a three axes sensor module including an acceleration sensor, and is disposed at a cabinet. At this time, the sensor assembly can be installed in at least any one of the rear portion of the lower end, the front portion of the upper end, and the rear portion of the upper end of the cabinet, or disposed on a manipulation panel.

Since the sensor assembly is disposed at the cabinet as described above, the sensor assembly can avoid the effect of high temperature. However, as a distance between a point of a knock input and the point of the acceleration sensor increases, the performance of sensing a knock deteriorates, and a noise signal can hardly be filtered. The portion where the door is installed and the portion where the sensor assembly is installed can be a different medium. Accordingly, vibrations caused by a knock applied to the door can be transferred to the sensor assembly through a plurality of mediums that physically connect to one another. A plurality of solid components that constitute an appliance and physically connect to one another can be the mediums.

A vibration signal sensed by the sensor assembly when vibrations input by a knock are transferred through a plurality of mediums differs from a vibration signal sensed by the sensor assembly when vibrations input by a knock are transferred through a single medium. For the sensor assembly to sense a knock applied to the door properly, information on the damping width of vibrations input by the knock, based on the sorts and number of mediums through which the vibrations pass, needs to be found previously, and based on the found information, settings in relation to the sensing operation of the sensor assembly need to differ.

The sorts and number of mediums can be set differently based on the sort, standard, function or feature and the like of an appliance. Accordingly, for a different sort or standard and the like of an appliance to which the sensor assembly is applied, settings in relation to the sensing operation of the sensor assembly need to differ.

That is, in such document, settings in relation to the sensing operation of the sensor assembly need to change or need to be adapted, depending on the sort or standard of an appliance.

Additionally, in a built-in appliance used in a living room or a kitchen, in particular, a built-in oven used in a kitchen, a cabinet forming the exterior of the appliance is often omitted. The built-in oven is usually installed in a way the built-in oven is fitted between kitchen furniture and a wall or between kitchen furniture and kitchen furniture. Accordingly, there is not enough space for installing the sensor assembly between a side of the appliance and kitchen furniture or a wall.

That is, the structure in which the sensor assembly is disposed on a side of an appliance can hardly be applied to a built-in appliance.

Further, the sensor assembly may be installed in an appliance where a plurality of ovens is adjacent to one another in a left-right direction or an up-down direction. However, since a single sensor assembly need to control lights of the plurality of ovens, the light of each oven can hardly be controlled based on a knock-on function.

That is, the sensor assembly's one-time sensing of a knock allows of simultaneous control over the lights of the plurality of ovens but does not allow of individual control over the light of each oven.

That is, in an appliance having a plurality of ovens, control of lighting, based on a knock-on function, can hardly be performed for each oven.

An appliance, which has a plurality of accommodation spaces and a plurality of doors for opening and closing the accommodation spaces and in which a sensor assembly is installed, is disclosed in KR 2021-0095506.

Here, the same number of the sensor assemblies as the number of the doors or accommodation spaces are respectively disposed on the sides of the appliance.

The appliance can ascertain the intensity of vibrations sensed respectively by the plurality of sensor assemblies installed as described above to determine a door to which a knock is applied. Based on results of the determination, the appliance can control the operation of a lamp installed in the accommodation space that is opened and closed by the door to which a knock is applied.

Accordingly, a vibration absorption member is disposed between the doors disposed vertically, and dampens vibrations. That is, vibrations caused by a knock on the upper door are dampened by the vibration absorption member, when the vibrations are transferred to a sensor assembly on the lower door, and vice versa.

However, settings in relation to the sensing operation of the sensor assembly need to change depending on the sort or standard of an appliance.

Further, the plurality of sensor assemblies are disposed at different points, and the appliance ascertains the intensity of vibrations sensed respectively by the plurality of sensor assemblies, and determines a door to which a knock is applied. To this end, a high accuracy in the settings needs to be ensured.

That is, like WO 2021/125430, the appliance of KR 2021-0095506 needs to change settings in relation to the sensing operation of the sensor assembly depending on the sort or standard of the appliance, and accuracy in the settings is required, spending large amounts of expenses and time embodying a knock-on function.

SUMMARY

Technical Problems

The objective of the present disclosure is to provide an appliance that has an improved structure in which a sensor can be installed to sense a knock input effectively even in an appliance such as an oven and the like that makes it difficult to attach a sensor to a door due to high-temperature heat.

Another objective of the present disclosure is to provide an appliance that has an improved structure in which a knock input can be sensed effectively even when a sensor for sensing a knock input is installed far from a door to avoid a high-temperature environment.

Another objective of the present disclosure is to provide an appliance that has an improved structure in which the accuracy of a sensor's sensing improves while the effect of heat on the sensor can decrease.

Furthermore, an embodiment of the present disclosure is to provide an appliance having a structure improved so that the transfer of vibration can be performed with high accuracy through a transfer member although a distance between a knock input position and a knock sensing position is increased.

Furthermore, another embodiment of the present disclosure is to provide an appliance having a structure improved so that vibration by a knock input can be transferred to an input switch with high accuracy.

Furthermore, still another embodiment of the present disclosure is to provide an appliance having a structure improved so that the accuracy of the sensing of a sensor can be suppressed from being influenced by another structure.

Another objective of the present disclosure is to provide an appliance that has an improved structure in which a structure for sensing a knock input is effectively installed in the appliance without being affected by or affecting electronic components in the appliance.

Another objective of the present disclosure is to provide an appliance that can perform the functions of sensing a knock input and sensing the closing of a door, with a single module.

Technical Solutions

An appliance according to one aspect includes an input switch that receives a knock input at the front of a main body, and a transfer member that connects to the input switch and transfers vibrations caused by a knock to a sensor disposed at the rear of the main body.

Accordingly, a knock input can be sensed effectively even in the case of an appliance such as an oven and the like that makes it difficult to attach a sensor to a door due to high-temperature heat.

In an appliance according to another aspect, a first sensing module for sensing a knock input is disposed at the edge of the upper portion of a cavity and a sensor of a sensor module is disposed at the rear of the cavity.

Since the sensor is disposed in a position that is not affected by heat, the operation error or damage of the sensor, caused by heat, is much less likely to occur.

In another aspect, a main body has a first accommodation space therein, and a first sensing module is installed in the main body in a way that the first sensing module is disposed outside the first accommodation space.

In another aspect, the first sensing module for sensing a knock input, and a second sensing module sensing the opening and closing of a door are installed in the main body in a way that the first sensing module and the second sensing module are disposed above the first accommodation space, and the first sensing module and the second sensing module are spaced from each other in the left-right direction of the main body with the first accommodation space therebetween.

In another aspect, a transfer member connects between an input switch disposed near the door and the sensor, and as the door is closed, vibrations of the door are transferred to the sensor through the transfer member.

Accordingly, the appliance may provide the function of sensing whether the door is opened and closed, and the function of determining whether a knock input is sensed depending on the opening and closing of the door.

In another aspect, the input switch is provided in the form of a switch that controls the flow of electric currents, and the transfer member is provided in the form of an electric wire that electrically connects between the input switch and the sensor.

Accordingly, it can be electrically determined whether the sensor operates, depending on the opening and closing of the door, and a knock input can be sensed through the transfer member in the form of an electric wire or a rod, and the like, performing the functions of sensing the knock input and sensing whether the door is closed.

An appliance according to one aspect may include a main body having a first accommodation space the front of which is open, therein; a door being disposed at the front of the first accommodation space, swiveling in the front-rear direction around the lower end, and opening and closing the first accommodation space; and a sensing module sensing vibrations that is caused by a knock input to the door.

Furthermore, the sensing module may include an input switch configured to receive vibration of the door on the front side of the first accommodation space, a sensor configured to sense vibration received by the input switch on the rear side of the first accommodation space, a transfer member configured to transfer the vibration input to the input switch to the rear side of the first accommodation space, and a support assembly installed in the main body and configured to support the sensor and to transfer, to the sensor, the vibration transferred through the transfer member.

Furthermore, the present disclosure may further include a contactor configured to have at least a part disposed between the main body and the door and installed in the door in a way to receive the vibration of the door.

Furthermore, the present disclosure may further include a support body inserted into the contactor.

Furthermore, it is preferred that the at least a part of the contactor is disposed between the input switch and the support body.

Furthermore, it is preferred that the contactor is formed of an elastically deformable material.

Furthermore, it is preferred that the support body is formed of a material having higher strength than that of the contactor.

Furthermore, the main body may include a cavity configured to form the first accommodation space therein, and a front panel disposed between the cavity and the door and configured to form, in front of the cavity, a surface facing the door that has closed the first accommodation space and to support the input switch.

Furthermore, it is preferred that at least a part of the input switch is disposed between the front panel and the contactor and exposed toward the contactor.

In one or more embodiments, the appliance may further comprise a rear panel disposed on a rear side of the cavity, and a cabinet configured to cover a side of the cavity on an outside thereof.

In one or more embodiments, the transfer member is disposed in a space outside of the cavity or in a space surrounded by the cavity, the rear panel and the cabinet or between the cabinet and an outer side wall of the cavity.

Furthermore, the support assembly may include a supporter configured to support the sensor and have a posture changed by the vibration transferred by the transfer member, and a supporter holder installed in the main body and configured to support the supporter in a way that the posture of the supporter is changeable.

Furthermore, it is preferred that a position of the sensor in the front-rear direction thereof is changed in conjunction with a change in the posture of the supporter.

Furthermore, the supporter holder may include
a holder main body coupled with the rear of the cavity and disposed on a lower side of the supporter, and rotation projection supports each configured to protrude upward from the holder main body and to support the supporter in a way to be rotatable.

Furthermore, the supporter holder may further include a front wall configured to protrude upward from the holder main body and disposed on a front side of the supporter.

Furthermore, the supporter holder may further include a load support part configured to protrude from the front wall and disposed in a moving path of the transfer member.

Furthermore, it is preferred that the transfer member is supported in the load support part in a way to be movable back and forth.

Furthermore, it is preferred that a passage hole is formed in the load support part in a way to penetrate the load support part back and forth and the transfer member passes through the load support part through the passage hole.

Furthermore, it is preferred that an open hole that opens the passage hole in the diameter direction of the passage hole is formed in the load support part.

Furthermore, the sensing module may further include a harness connected to the sensor. The supporter holder may further include a harness support part configured to support the harness and to regulate positions of the harness in a lateral direction and an up-down direction thereof.

Furthermore, it is preferred that the harness is supported in the harness support part in a way to be movable back and forth.

Furthermore, it is preferred that the harness support part protrudes in a lateral direction thereof from the front wall and is disposed on a side higher than a connection portion of the sensor and the harness.

Furthermore, the main body may include a cavity configured to form the first accommodation space therein; and a rear panel disposed on the rear side of the cavity and configured to have the support assembly installed therein.

Furthermore, the rear panel may include a panel main body part configured to form a plane parallel to a rear surface of the cavity, a first extension part configured to extend from an end of the panel main body part in a lateral direction thereof to a rear side thereof, and a second extension part configured to extend in a lateral direction thereof from an end of the first extension part on a rear side thereof and to extend in a direction that becomes distant from the panel main body part.

Furthermore, it is preferred that the support assembly is disposed in a space that is surrounded by the first extension part and the second extension part.

Furthermore, the supporter holder may further include a lateral projection that protrudes from the supporter holder to the first extension part.

Furthermore, it is preferred that at least a part of the lateral projection is disposed between the first extension part and the supporter in the lateral direction of the supporter holder.

Furthermore, it is preferred that the lateral projection protrudes from at least any one of the holder main body and the front wall to the first extension part.

Furthermore, it is preferred that the supporter holder is coupled with the first extension part.

Furthermore, it is preferred that a first fastening hole and a second fastening hole are formed in the first extension part in a way to penetrate the first extension part back and forth, the supporter holder further includes a fastening projection configured to protrude from the holder main body to a rear side thereof, and the fastening projection is inserted into the first extension part through the first fastening hole.

Furthermore, the supporter holder may further include a hook projection that protrudes to the outside of the fastening projection.

Furthermore, it is preferred that the hook projection is provided in a way to be elastically deformable in the direction in which the hook projection appears and disappears from the fastening projection.

Furthermore, it is preferred that a third fastening hole communicating with the second fastening hole is formed in the holder main body in a way to penetrate the holder main body back and forth.

Furthermore, it is preferred that the supporter holder further includes a fastening member configured to penetrate the first extension part and the holder main body through the second fastening hole and the third fastening hole and configured to couple the rear surface panel and the supporter holder Advantageous Effects An appliance according to the present disclosure may effectively sense a knock input even in the case of an appliance such as an oven and the like that makes it difficult to attach a sensor to a door due to high-temperature heat, reduce the effect of heat on the sensor, and improve accuracy of the sensor's sensing.

According to the present disclosure, since the sensor is disposed in a position that is not affected by heat, the sensor may be much less likely to experience an operational error or damage caused by heat.

Thus, according to the present disclosure, the effect of heat on the sensor may decrease, and accuracy of the sensor's sensing may improve.

Furthermore, the present disclosure can prevent the sensor from being overheated by the influence of a high temperature part of the rear panel by maintaining a distance between the side of the rear panel, that is, a portion having a high temperature, and the supporter holder that supports the sensor to the first lateral projection or the second lateral projection by a given distance or more.

Accordingly, the present disclosure can provide effects in that it can prevent a malfunction and the deterioration of reliability of the sensor from occurring and also improve operation reliability of the first sensing module by allowing a change in the posture of the supporter to be smoothly performed without being hindered by the rear panel.

Furthermore, the present disclosure can suppress the occurrence of the sagging of the transfer member in a way that the transfer member that connects the input switch to which a knock is input and the supporter supporting the sensor is supported by the load support part provided in the supporter holder and thus the number of points at which the transfer member is supported is increased.

Accordingly, the present disclosure can improve the accuracy of the sensing of vibration by the sensor by allowing the transfer of vibration from the transfer member to the supporter to be performed with high accuracy.

Furthermore, the present disclosure includes the contactor that is formed in a way to be elastically deformable and that is installed in the door in a way to come into contact with the input switch. The contactor can accommodate a support body having high strength.

That is, the present disclosure includes the contactor that accommodate the support body having high strength therein and that may come into contact with the input switch through a surface that is elastically deformable and soft. Accordingly, an impact and noise occurring when the input switch and the door come into contact with each other can be reduced, and vibration applied to the door can also be transferred to the input switch with high accuracy.

Furthermore, according to the present disclosure, a harness connected to the sensor can be supported by the harness support part provided in the supporter holder. Accordingly, weight of the harness applied to the connection portion of the sensor and the harness can be reduced.

Accordingly, the present disclosure can prevent an operation of changing the posture of the supporter from being influenced by the harness, and thus can improve the accuracy of the sensing of vibration by the sensor.

Furthermore, the present disclosure can provide an effect in that a connection between the sensor and the harness can be further stably maintained by reducing weight of the harness applied to the connection portion of the sensor and the harness.

Furthermore, the present disclosure can improve the accuracy of the sensing of vibration by the sensor by performing the transfer of vibration from the transfer member to the supporter with high accuracy.

According to the present disclosure, a knock input may be effectively sensed without being affected by or affecting electronic components installed in the appliance.

According to the present disclosure, a transfer member may connect between an input switch disposed near the door, and the sensor, and when the door is closed, vibrations of the door may be transferred to the sensor through the transfer member, providing the function of sensing whether the door is opened and close and the function of determining whether a knock input is sensed depending on the opening and closing of the door.

According to the present disclosure, depending on the opening and closing of the door, the operation of the sensor 110 may be determined electrically, and a knock input may be sensed through the transfer member in the form of an electric wire or a rod, and the like, performing the function of sensing a knock input and the function of sensing the closing of the door together.

DETAILED DESCRIPTION

Figure 1:
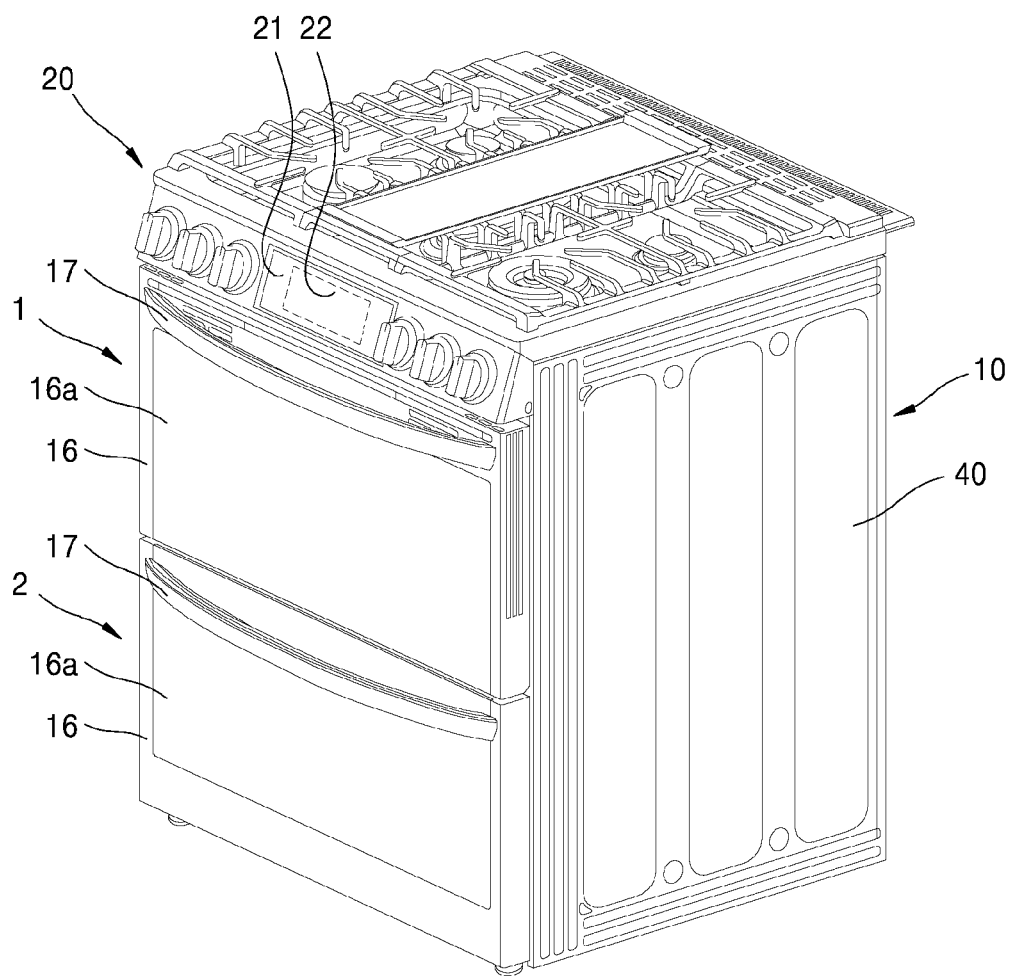
FIG. 1 is a front perspective view illustrating an appliance according to an embodiment of the present disclosure.

The above-described aspects, features and advantages are specifically described hereunder with reference to the accompanying drawings such that one having ordinary skill in the art to which the present disclosure pertains can easily implement the technical idea of the disclosure. In the disclosure, detailed description of known technologies in relation to the subject matter of the disclosure is omitted if it is deemed to make the gist of the disclosure unnecessarily vague. Below, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component unless stated to the contrary.

Embodiments are not limited to the embodiments set forth herein, and can be modified and changed in various different forms. The embodiments in the disclosure are provided such that the disclosure can be through and complete and the scope of the disclosure can be fully conveyed to one of ordinary skill in the art. Accordingly, all modifications, equivalents or replacements as well as a replacement of the configuration of one embodiment with the configuration of another embodiment or an addition of the configuration of one embodiment to the configuration of another embodiment, within the technical scope of the disclosure, should be construed as being included in the scope of the disclosure.

The accompanying drawings are provided for a better understanding of the embodiments set forth herein and are not intended to limit the technical idea of the disclosure. It is to be understood that all the modifications, equivalents or replacements within the technical scope of the disclosure are included in the scope of the disclosure. Sizes or thicknesses of the components in the drawings are exaggerated or reduced to ensure ease of understanding. However, the protection scope of the subject matter of the disclosure should not be interpreted in a limited way.

The terms in the disclosure are used only to describe specific implementations or embodiments but not intended to limit the subject matter. The singular forms "a", "an" and "the" are intended to include the plural forms as well, unless explicitly indicated otherwise. It is to be understood that the terms "comprise", "include" and the like, set forth herein, are used to indicate presence of features, numbers, steps, operations, components, parts or combinations thereof, and do not imply the exclusion of one or more additional features, numbers, steps, operations, components, parts or combinations thereof.

The terms "first", "second" and the like are used herein only to distinguish one component from another component. Thus, the components should not be limited by the terms.

When one component is described as being "connected" or "connected" to another component, one component can be directly connected or connected to another component. However, it is also to be understood that an additional component can be "interposed" between the two components. When one component is described as being "directly connected" or "directly connected" to another component, it is to be understood that no additional component is interposed between the two components.

When one component is described as being "on" or "under" another component, one component can be directly on or under another component, and an additional component can be interposed between the two components.

Unless otherwise defined, all the terms (technical or science words) used herein have the same meaning as commonly understood by one of ordinary skill in the art. Additionally, terms such as those defined in commonly-used dictionaries should be interpreted as having a meaning that is consistent with their meaning in the context of the relevant art, and unless explicitly defined herein, should not be interpreted in an ideal or overly formal way.

In the state in which an appliance lies on the floor, with respect to the center of the appliance, a direction in which a door is installed is defined as a forward direction. Accordingly, a direction toward the inside of the appliance with the door open is defined as a rearward direction. For convenience, a direction facing the front and the rear can be referred to as a first direction. Then the forward direction can be referred to as one direction of the first direction, and the rearward direction can be referred to as the other direction of the first direction.

Additionally, a gravitational direction can be defined as a downward direction, and a direction opposite to the gravitational direction can be defined as an upward direction.

Further, a horizontal direction across a front-rear direction of the appliance, i.e., a widthwise direction of the appliance that is seen in front of the door of the appliance can be referred to as a left-right direction. For convenience, the left-right direction can be referred to as a second direction. Then the right side can be referred to as one direction of the second direction, and the left side can be referred to as the other direction of the second direction.

Additionally, the widthwise direction of the appliance can also be referred to as a lateral direction. Then the right side can also be referred to as one side of the lateral direction, and the left side can be referred to the other side of the lateral direction.

An up-down direction can be referred to as a third direction. Then the upward direction can be referred to as one direction of the third direction, and the downward direction can be referred to as the other direction of the third direction.

Further, the up-down direction can be referred to as a longitudinal direction. Then the front-rear direction and the left-right direction, i.e., the first direction and the second direction, can be referred to as a transverse direction.

Throughout the disclosure, the terms "A and/or B" as used herein can denote A, B or A and B, and the terms "C to D" can denote C or greater and D or less, unless stated to the contrary.

[Entire Structure of Appliance]

Figure 2:
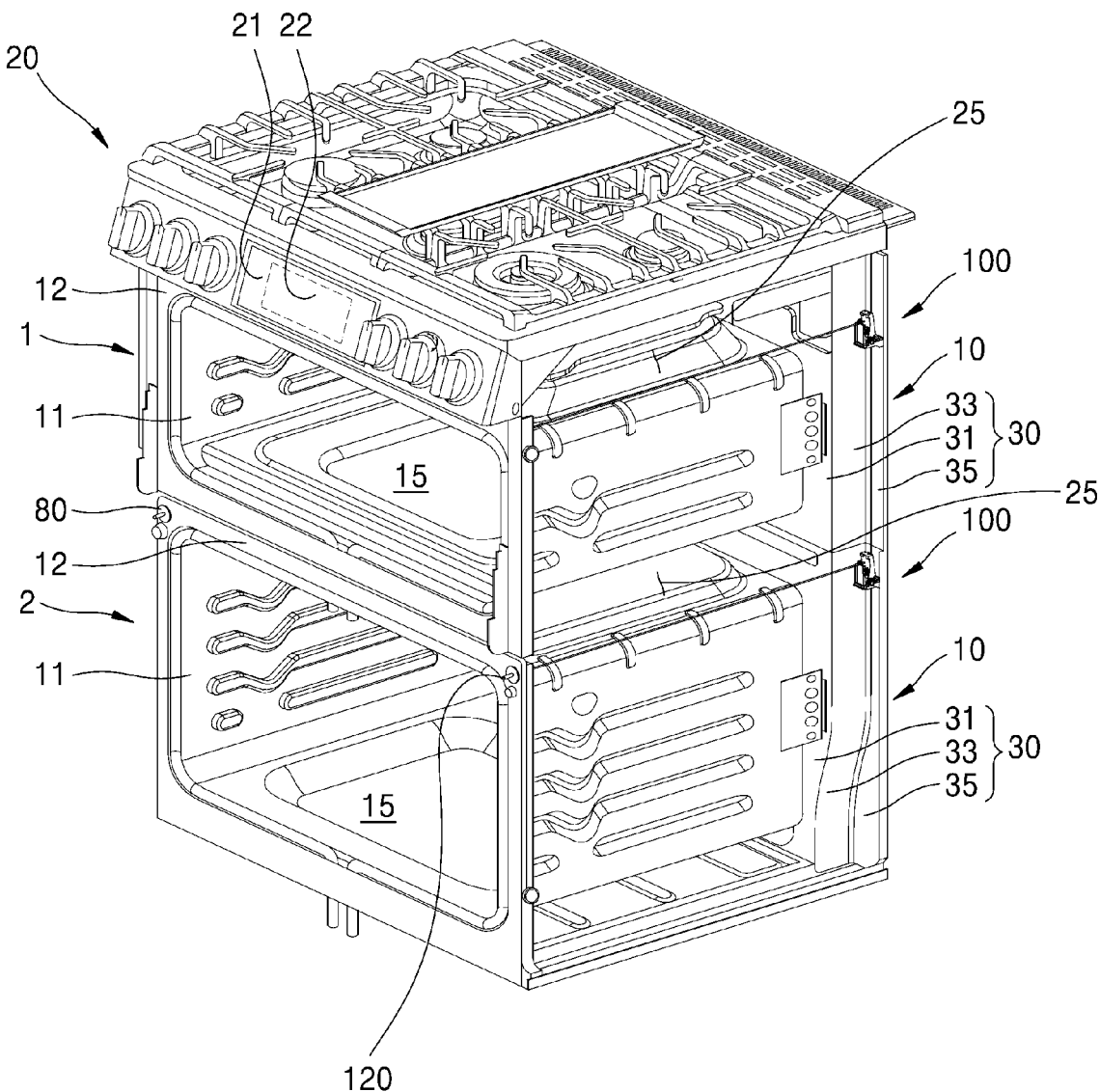
FIG. 2 is a front perspective view illustrating the state in which the door and cabinet of the appliance illustrated in FIG. 1 have been removed.
Figure 3:
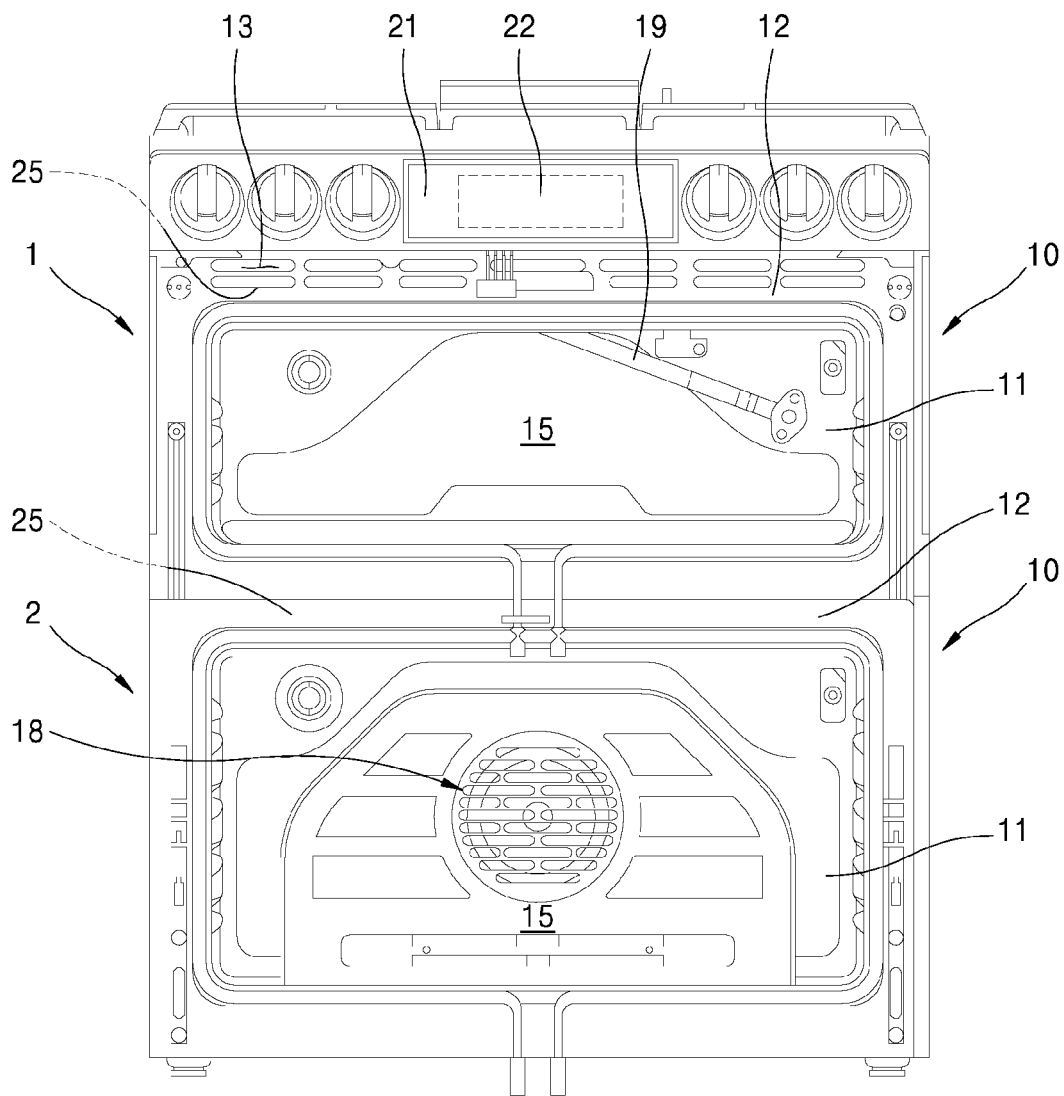
FIG. 3 is a front view illustrating the state in which the door and cabinet of the appliance illustrated in FIG. 1 have been removed.
Figure 4:
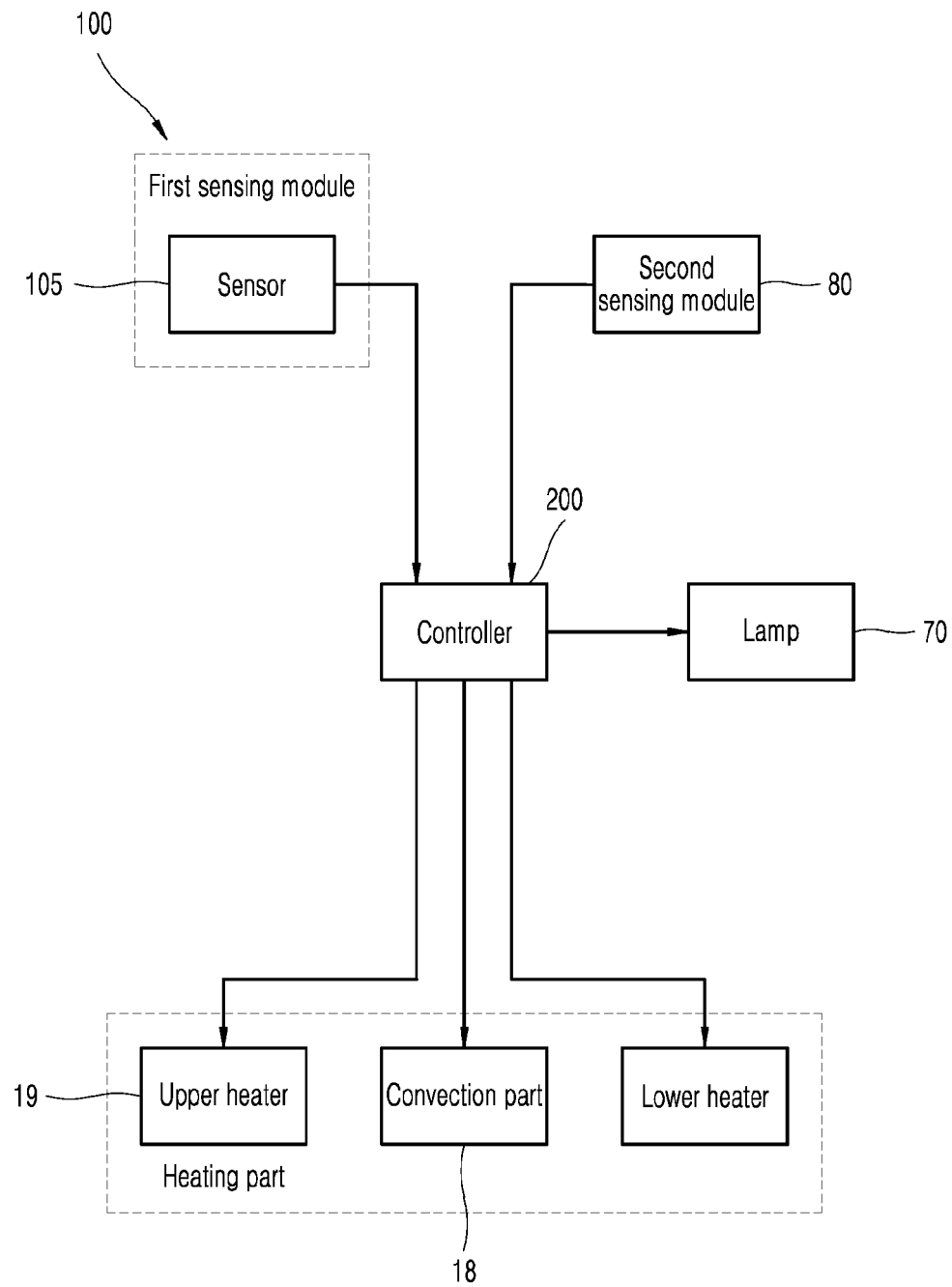
FIG. 4 is a construction diagram schematically illustrating a construction of the appliance according to an embodiment of the present disclosure.

FIG. 1 is a front perspective view illustrating an appliance according to an embodiment of the present disclosure. FIG. 2 is a front perspective view illustrating the state in which the door and cabinet of the appliance illustrated in FIG. 1 have been removed. FIG. 3 is a front view illustrating the state in which the door and cabinet of the appliance illustrated in FIG. 1 have been removed. FIG. 4 is a construction diagram schematically illustrating a construction of the appliance according to an embodiment of the present disclosure.

Referring to FIG. 1, the appliance of one embodiment may include a first unit 1 in the upper portion of the appliance, and a second unit 2 in the lower portion of the appliance.

In the embodiment, a cooking appliance is described as an example of the appliance. However, the appliance according to the present disclosure is not limited to a cooking appliance. Other types of appliances such as a washing machine, a dryer, a dishwasher and the like rather than a cooking appliance may be applied to the appliance in the present disclosure.

In the embodiment, while a cooking appliance is provided as an example of the appliance, the first unit 1 and the second unit 2 are both sealed-type cooking appliances such as an electric oven and the like, for example, but not limited.

For example, the first unit 1 in the upper portion of the cooking appliance may be an electric oven, while the second unit 2 in the lower portion of the cooking appliance may be a gas oven. On the contrary, while the first unit 1 in the upper portion of the cooking appliance may be a gas oven, the second unit 2 in the lower portion of the cooking appliance may be an electric oven.

In another example, another type of sealed-type cooking appliances such as a microwave oven that is not an oven may be applied to the first unit 1 or the second unit 2, and open-type cooking appliances such as a cooktop, a hop, a griddle and the like may be applied to the first unit 1 and disposed on the second unit 2.

Hereafter, the configuration of the cooking appliance is described under the assumption that the first unit 1 and the second unit 2 are both electric ovens. Additionally, in description of the configuration of the cooking appliance, the configuration of the first unit 1 is mainly described.

Referring to FIGS. 2 to 5, the exterior of the first unit 1 is formed by a main body 10. The main body 10 may be formed into a shape including an approximately rectangular cuboid shape. The main body 10 may be made of a material having predetermined strength, to protect a plurality of components installed in the inner space of the main body 10.

The main body 10 may form a cavity 11 inside the main body 10 forming its skeleton, and a front panel 12 being disposed at the front of the main body 10 and in front of the cavity 11 and forming the front surface of the main body 10. The cavity 11 is surrounded by outer walls being part of the main body 10. The outer walls form a cuboid space being open at its front. The cavity 11 has a cooking space 15 therein, and an open portion may be formed inside the front panel 12, The cooking space 15 is accessible via the open portion in the front panel 12.

Generally, the main body 10 may have a first accommodation space therein. In the embodiment, the appliance is a cooking appliance, for example. Accordingly, the first accommodation space formed in the main body 10 may be a cooking space 15 needed to cook food items. Hereafter, the structure of the appliance is described under the assumption that the first accommodation space is the cooking space 15.

The cooking space 15 may be formed as a cuboid, the front surface of which is open. When the cooking space 15 is closed, the cooking appliance can heat the inner space of the cooking space 15 to cook food items. That is, in the cooking appliance, the inner space of the cooking space 15 is a space in which food items are actually cooked.

The cooking appliance may be provided with a heating part that heats the cooking space 15. As an example of the heating part, a convection part 18 may be provided at the rear side of the cooking space 15, and heats the inner space of the cooking space 15 as a result of convention of hot air.

Additionally, an upper burner may be provided at the upper side of the cooking space 15, as the heating part, and heats the inner space of the cooking space 15 from above. Further or alternatively, a lower burner may be provided at the lower side of the cooking space 15, as the heating part, and heats the inner space of the cooking space 15 from below.

The main body 10 may include a lamp 70. The lamp 70 is provided to light up the first accommodation space, i.e., the inside of the cavity 11 or cooking space 15. The lamp 70 may be installed in the cavity 11 or installed at the main body to emit its light into the cavity 11. In the embodiment, the lamp 70 is disposed on a lateral surface of the cavity 11, for example.

A door 16 may be swivably or rotatably disposed at the front of the main body 10 for selectively open and closing the cooking space 15. The door 16 may open and close the cooking space 15 in a pull-down manner, i.e., in a way that the upper end of the door 16 swivels around the lower end of the door 16.

The door 16 may be formed entirely as a cuboid having a predetermined thickness. Additionally, a handle 17 may be disposed on the front surface of the door 16 such that a user may grip the handle 17 to swivel the door 16.

Further, the door 16 may be provided with a see-through window 16a. The see-through window 16a may be made of a transparent material such as glass, transparent plastics and the like. Depending on an appliance to which the see-through window 16a is applied, the see-through window 16a needs to withstand high temperature and high pressure, and when necessary, has resistance against water, heat and the like.

A control panel 20 may be disposed in the upper portion of the front surface of the appliance, i.e., on the front surface of the upper portion of the cavity 11 or any other suitable place. The control panel 20 may form a portion of the exterior of the front surface of the appliance. A display part may be disposed on the control panel 20. The display part may include an input part 21 that is used for adjusting the operations of the appliance, and a display 22 that displays the operation state of the appliance.

In an example, the input part 21 and the display 22 may be formed on a single panel. For example, the input part 21 and the display 22 may be formed as a touch panel that receives the user's touch input.

The display part may display a user interface (UI) or a graphic user interface (GUI) in relation to the driving of the appliance.

Specifically, the display part may include at least one of a liquid crystal display, a thin film transistor-liquid crystal display, an organic light-emitting diode, a flexible display, and a 3D display.

When the display part and a touch sensor for sensing a touch operation have a mutually layered structure to form a touch screen, the display part may be used as an input device as well as an output device. The touch sensor, for example, may be formed as a touch film, a touch sheet, a touch pad and the like.

Additionally, the touch sensor may convert a change in pressure applied to a specific portion of the display or capacitance occurring in a specific portion of the display part and the like into an electrical input signal.

A plurality of buttons may be displayed in the display part. For example, a knock-on button for setting a function of turning on/off the lamp 70 installed in the cooking space 15, based on the user's knock input, may be provided and/or displayed in the display part.

Further, a lamp button for setting a function of turning on/off the lamp 70 manually may be provided and/or displayed in the display part. Under the assumption that the appliance is an oven, a self-clean button for setting a self-cleaning function of the cooking space 15 and the like may be provided and/or displayed in the display part.

A second accommodation space may be provided outside the cavity 11, specifically, in the upper portion of the cavity 11. The second accommodation space may be respectively provided in the upper portion of the cavity 11 in the first unit 1, and in the upper portion of the cavity 11 in the second unit 2.

The second accommodation space in the second unit 2 is a space formed between the cavity 11 of the second unit 2 and the cavity 11 of the first unit 1. The second accommodation space in the first unit 1 is a space formed in the upper portion of the cavity 11 in the first unit 1. The second accommodation space in the first unit 1 may be used as a component room 25 for installing electronic components needed for the operations of the appliance.

In summary, the second accommodation space is respectively formed between the first unit 1 and the second unit 2 and in the upper portion of the first unit 1, and out of the second accommodation spaces, the second accommodation space in the upper portion of the first unit 1 may be used as the component room 25 or both second accommodation spaces may be used as component rooms 25.

The component room 25 may be disposed in the upper portion of the cavity 11 and behind the control panel 20. The component room 25 may have a space for installing electronic components, therein.

The front surface of the component room 25 may be blocked or covered by the front panel 12. The front panel 12 may be disposed between the cavity 11 and the door 16. The front panel 12 may be disposed in a way that at least a portion of the front panel 12 blocks the front of the component room 25. For example, the upper area of the front panel 12 disposed in the upper portion of the cooking space 15 may block the front surface of the component room 25.

In the embodiment, the front panel 12 may protrude from the upper portion of the cavity 11 and define the front boundary surface of the second accommodation space. That is, the front panel 12 provided at the second unit 2 may block the second accommodation space formed between the first unit 1 and the second unit 2, from the front. Additionally, the front panel 12 provided at the first unit 1 may define the front boundary surface of the component room 25, in the upper portion of the cavity 11.

A suction opening 13 may be formed on the front panel 12. The suction opening 13 may be formed on the front panel 12 in a way that penetrates in the front-rear direction. The suction opening 13 may form a passage for allowing external air to pass through the front panel 12 and flow into the second accommodation space, on the front panel 12.

On the front panel 12 provided at the first unit 1, a passage through which air outside the component room 25 flows into the component room 25 may be formed by the suction opening 13.

The suction opening 13 may be biased toward the end portion of one side of the front panel 12 in the left-right direction thereof from the left-to-right center of the front panel 12. For example, the suction opening 13 may be disposed from the left-to-right center of the front panel 12 to the right side of the front panel 12.

[Schematic Configuration of First Sensing Module, Second Sensing Module and Controller]

The appliance in the embodiment may include a first sensing module 100, a second sensing module 80 and a controller 200.

The first sensing module 100 may be provided to sense vibrations caused by a knock input to the door 16. As the first sensing module 100 senses vibrations caused by a knock, the first sensing module 100 may operate in a way that outputs a first signal.

The first sensing module 100 may be installed in or at the main body 10. At least a portion of the first sensing module 100 may be exposed toward the door 16 from the main body 10. In the embodiment, while a portion of the first sensing module 100 is disposed on the front panel 12 in a way that penetrates in the front-rear direction, for example. Description in relation to this is provided hereafter.

The first sensing module 100 may include a sensor 110 capable of sensing vibrations. The sensor 110 may sense a knock input applied to the appliance. Specifically, the sensor 110 may be a sensor that senses vibrations transferred by a medium. As vibrations generated in the door 16 by a knock is transferred to the sensor 110 through a medium, the sensor 110 may sense the vibrations. So, the sensor 110 is disposed spaced apart from the location where the knock is input. The medium is between the sensor 110 and the location of receiving the knock at the door 16.

Certainly, the sensor 110 may sense vibrations caused by another factor as well as vibrations caused by a knock. In the embodiment, the sensor 110 is provided to sense and identify vibrations, in particular, caused by a knock that is input by the user.

Accordingly, the sensor 110 in the embodiment may accurately distinguish vibrations caused by a knock that is input by the user from vibrations caused by another factor. For example, the sensor 110 may sense vibrations, which are transferred in a pattern identical with a pattern unique to vibrations caused by a knock, as vibrations caused by the user's knock.

There may be another sensing module being designated as second sensing module 80. The second sensing module 80 may be provided to sense the opening and closing state of process of the door 16. The second sensing module 80 may sense the opening and closing of the door 16, between the main body 10 and the door 16.

The second sensing module 80 may be installed in or at the main body 10. At least a portion of the second sensing module 80 may be exposed toward the door 16 from the main body 10. In the embodiment, a portion of the second sensing module 80 is disposed on the front panel 12 in a way that penetrates in the front-rear direction, for example. Description in relation to this is provided hereafter. The information whether the door is open or closed is useful for determining whether a knock is input at the door 16, since a knock input is unlikely to be input if the door 16 is open, since then the surface of the door 16 for usually receiving the knock is faced downwardly.

In the embodiment, the first sensing module 100 may be disposed in the second accommodation space or outside the first accommodation space, i.e., above the cooking space 15, and outside the cavity 11 or cooking space 15, i.e. at the left or right side of the cavity 11. The second sensing module 80 may also be disposed above the first accommodation space, and outside the first accommodation space in the left-right direction.

The second sensing module 80 and the first sensing module 100 may be spaced from each other in the left-right direction, with the first accommodation space therebetween. For example, the first sensing module 100 and the second sensing module 80 are spaced from each other with the cooking space 15 therebetween. The first sensing module 100 is disposed or biased toward the left side of the front panel 12, and the second sensing module 80 is disposed or biased toward the right side of the front panel 12 or vice versa.

In the embodiment, the second sensing module 80 includes a switch, for example a tact switch. The second sensing module 80 is pressed and turned on by the door 16 as the door 16 is closed, and is turned off as the door 16 is opened.

The second sensing module 80, pressed and turned on by the door 16, may output a second signal, and the operations of components, which are supposed to be performed as the second signal is output, may be controlled by the controller 200.

The controller 200 may control the operations of the appliance. For example, the controller 200 may control the operations of the heating part, the lamp 70, the fan 40 and the like, based on a manipulation signal that is input through the display part, the input part 21 and the like of the control panel 20.

Additionally, the controller 200 may control the operation of the display 22 that displays the operation state of the appliance. For example, the controller 200 may be constituted by a micro controller mounted on the circuit board.

[Schematic Structure of First Sensing Module and Structure of Sensor]

Figure 5:
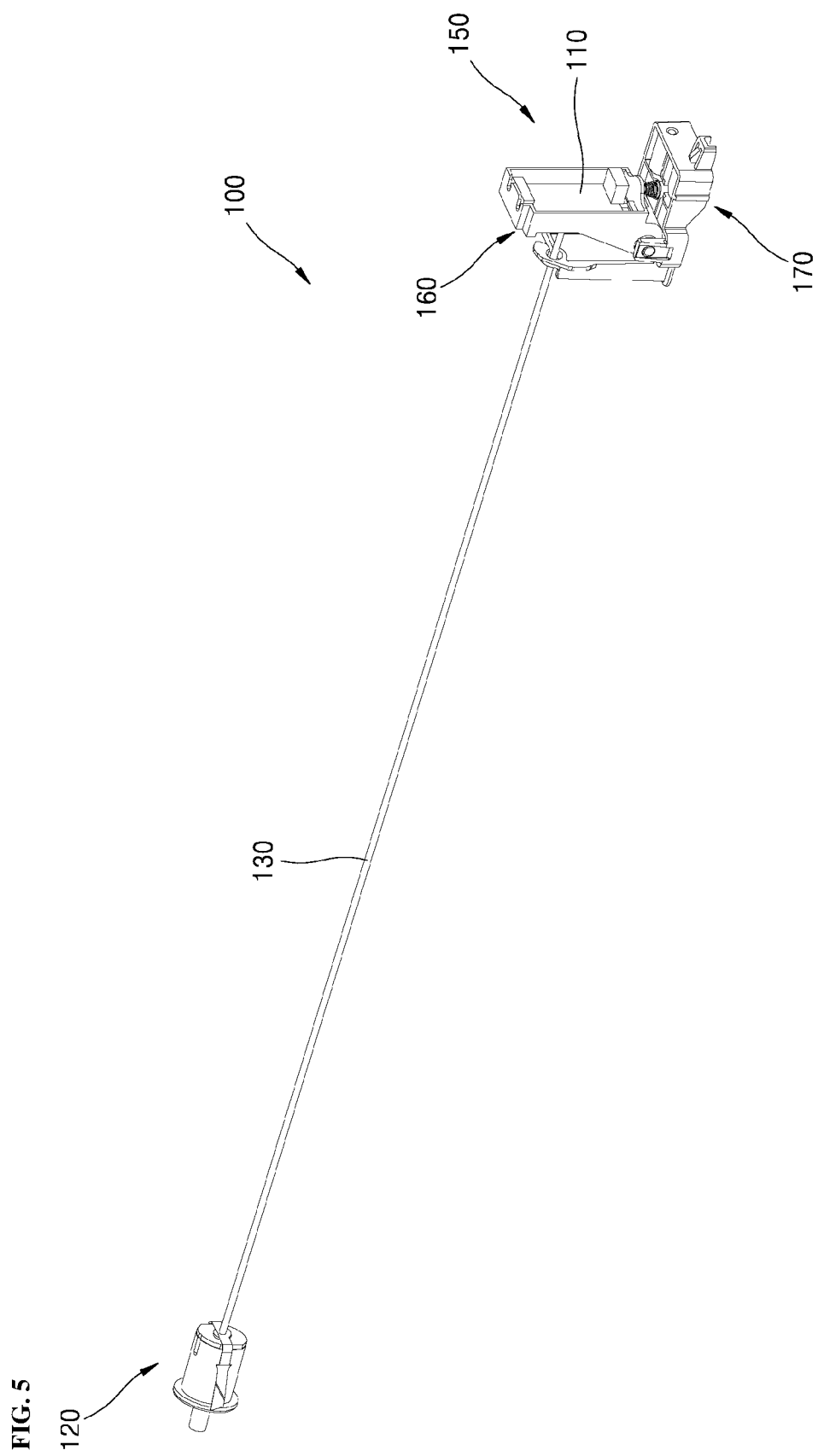
FIG. 5 is a perspective view illustrating that the construction of a first sensing module according to an embodiment of the present disclosure has been separated.
Figure 6:
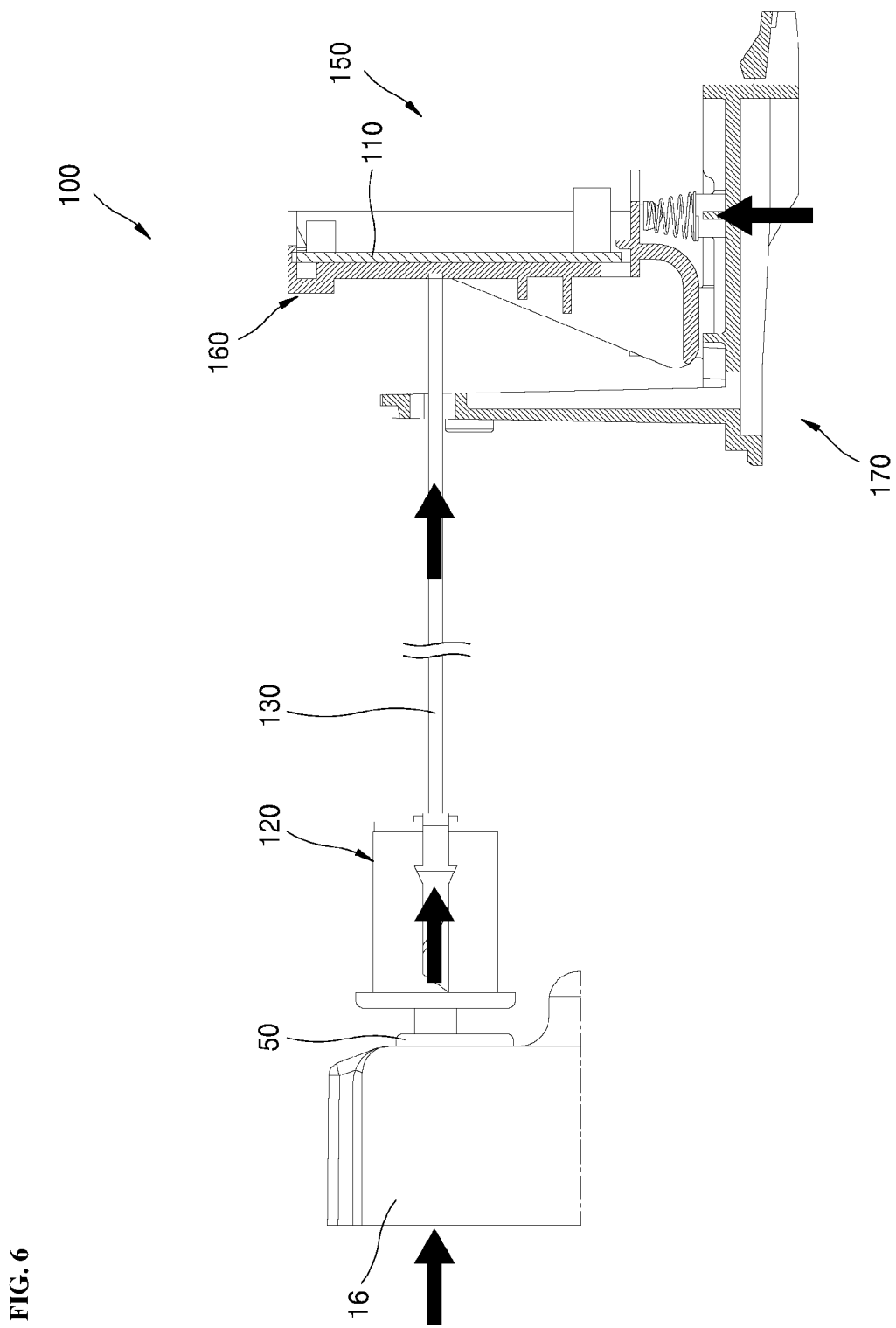
FIG. 6 is a side view illustrating the state in which the first sensing module illustrated in FIG. 5 has been connected.
Figure 7:
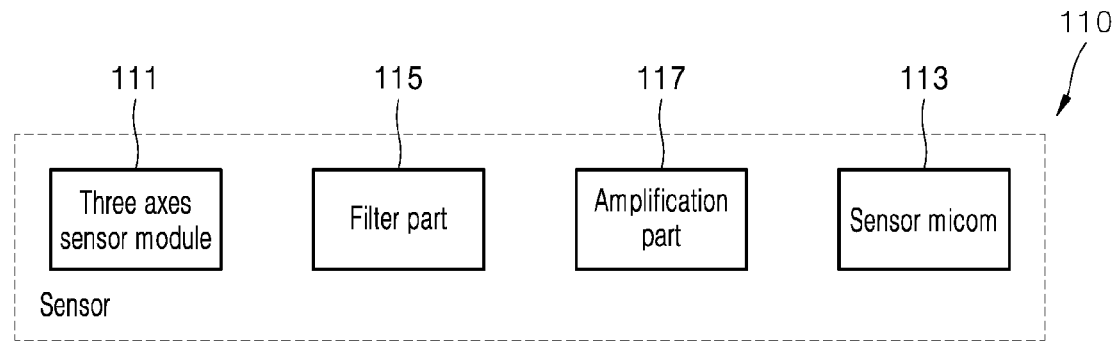
FIG. 7 is a diagram schematically illustrating a construction of a sensor provided in the first sensing module illustrated in FIG. 5.

FIG. 5 is a perspective view illustrating that the construction of a first sensing module according to an embodiment of the present disclosure has been separated. FIG. 6 is a side view illustrating the state in which the first sensing module illustrated in FIG. 5 has been connected. FIG. 7 is a diagram schematically illustrating a construction of a sensor provided in the first sensing module illustrated in FIG. 5.

Referring to FIGS. 1 to 6, the first sensing module 100 may include an input member or input switch 120, a transfer member 130, a sensor 110 and a support assembly 150.

The input switch 120 may be provided to receive vibrations of the door 16. The input switch 120 may be disposed at the frontmost side of the first sensing module 100.

At least a portion of the input switch 120 may be disposed between the cavity 11 and the door 16. In the embodiment, the input switch 120 is disposed on or at the front panel 12, for example. At least a portion of the input switch 120 may be exposed to the front of the front panel 12 and/or being supported by the front panel 12. That is, the input switch 120 may be disposed on or at the front panel 12 in a way that at least a portion of the input switch 120 is disposed between the front panel 12 and the door 16.

In the embodiment, the front panel 12 may have an open portion that exposes the cooking space 15 to the front of the front panel 12, and the input switch 120 may be disposed further upward than the open portion. At this time, the left-to-right position of the input switch 120 may be adjacent to the left-to-right end portion of the open portion as illustrated in FIG. 3.

Additionally, the front panel 12 may have a suction opening 13 and an opening part and the suction opening 13 may be biased toward the end portion of one side of the front panel 12 in the left-right direction of thereof. Additionally, the input switch 120 may be disposed between the end portion of one side of the front panel 12 in the left-right direction thereof and the suction opening 13.

That is, the input switch 120 is biased further toward one side in the left-right direction than the suction opening 13, and the first sensing module 100 provided with the input switch 120 may be disposed near the end portion of one side of the appliance in the left-right direction thereof. In other words, the input switch 120 is located in the upper left corner of the front panel 12, so that the vibrations caused by the hinges of the door are most far away.

The transfer member 130 may be provided to transfer vibrations, transferred to the input switch, to the sensor 110. In the embodiment, the sensor 110 may be disposed at the rear of the cavity 11, and the transfer member 130 may connect between the input switch 120 and the sensor 110. That is, the transfer member 130 may be provided to connect between the input switch 120 disposed at the front of the cavity 11 and the sensor 110 disposed at the rear of the cavity 11.

For example, the transfer member 130 may be formed into a thin rod that is elongated in the front-rear direction. The end portion of the front side of the transfer member 130 may be connected to the input switch 120, and the end portion of the rear side of the transfer member 130 may be connected to the support assembly 150 at which the sensor 110 is disposed.

The transfer member 130 may be connected between the input switch 120 and the sensor 110 while passing through the second accommodation space or through the space outside the cavity. In the embodiment, the input switch 120 is disposed in the upper portion of the first accommodation space and/or at the front of the second accommodation space, and the sensor 110 may be disposed at the rear of the second accommodation space. The transfer member 130 connecting the input switch 120 and the sensor 110 may be installed in a way that passes through the second accommodation space.

In the first unit 1, the second accommodation space may be used as a component room 25. Accordingly, the transfer member 130 provided in the first unit 1 may connect between the input switch 120 and the sensor 110 while passing through a component room 25 where electronic components connected to and controlled by the controller 200 are disposed.

The transfer member 130, provided as described above, may serve as a single medium for transferring vibrations input through the door 16 and the input switch 120 toward the sensor 110.

In the embodiment, the transfer member 130 is formed into a rod, for example. Preferably, the transfer member 130 may be formed as a rod having a rigid body causing no vibration damping.

The sensor 110 may be disposed at the rear of the cavity 11 and at the rear of the first accommodation space or at the backside of the cavity 11, as described above. The sensor 110 may sense a vibration sensing signal corresponding to vibrations, and based on the sensed vibration sensing signal, determine whether a knock is input. In an example, the sensor 110 may determine that a knock is applied when vibration sensing signals of a predetermined threshold or greater are sensed continuously at predetermined intervals.

Vibrations caused by a knock may be produced only in the first axis direction among three axes directions. For example, vibrations caused by a knock may be produced only in the direction of any one of the x-axis, y-axis and z-axis. Considering the fact, to determine whether vibrations are caused by a knock, it needs to be found which direction of vibrations causes a sensed vibration sensing signal.

In another example, the sensor 110 may compare the pattern of a vibration sensing signal caused by a knock with the pattern of an actually sensed vibration sensing signal, and based on results of the comparison, determine whether vibrations are caused by a knock.

The pattern of the vibration sensing signal caused by a knock (hereafter, a "predetermined knock signal") may be determined previously. The sensor 110 may compare the pattern of an actually sensed vibration sensing signal with the pattern of the predetermined knock signal, and based on results of the comparison, determine whether vibrations are caused by a knock.

The sensor 110 may sense vibrations that are transferred in all directions. For example, the sensor 110 may include a vibration sensor having a plurality of axes. The sensor 110 including the vibration sensor may sense vibrations that are transferred in a plurality of axes directions.

That is, the sensor 110 in the embodiment senses vibrations that are transferred in three axes directions, and may sense vibrations corresponding to a knock by combining vibration sensing signals corresponding to the vibrations in the three axes directions.

Figure 11:
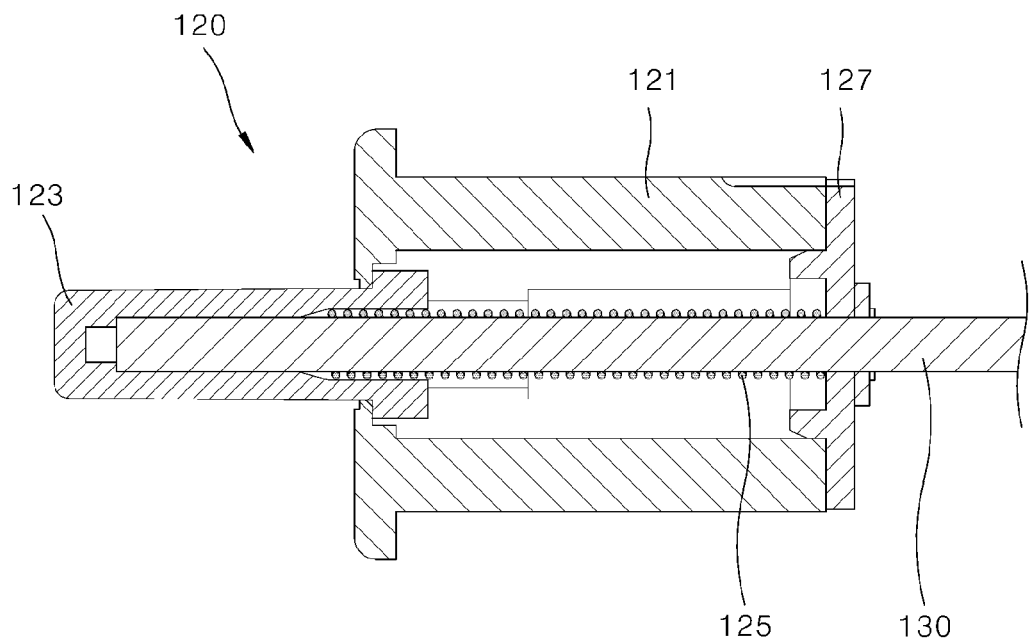
FIG. 11 is a cross-sectional view illustrating an internal structure of the input switch according to an embodiment of the present disclosure.

The sensor 110, as illustrated in FIGS. 4 and 11, may include a three-axes sensor module 111 and a sensor microcomputer/microcontroller or micom 113.

In an example, the three axes sensor module 111 may include a single three axes acceleration sensor that senses vibrations, transferred in three axes directions orthogonal to one another, at the same time. The three axes acceleration sensor may detect three axes components of acceleration with a single sensor. The three axes acceleration sensor may detect a very small change in the movement (acceleration) of a medium in the three axes directions orthogonal to one another, which is caused by vibrations, respectively.

At this time, the three axes acceleration sensor may be installed such that any one axis direction among the three axes directions is aligned with the direction of vibrations caused by a knock, for example. Since the three axes acceleration sensor is installed as described above, accuracy in the sensor 110's sensing of knock vibrations may improve.

In another example, the three axes sensor module 111 may include three independent acceleration sensors. In another example, the three axes sensor module 111 may include four or more independent acceleration sensors. As the number of acceleration sensors increases, accuracy in the sensor 110's sensing of vibrations may improve.

At this time, at least one of the plurality of acceleration sensors may be installed such that the direction of the axis of the acceleration sensor's sensing of vibrations is aligned with the direction of vibrations caused by a knock, for example. As the direction of vibrations caused by a knock is aligned with the direction of any one of the three axes, accuracy in the sensor 110's sensing of vibrations caused by a knock may improve.

In yet another example, a first axis acceleration sensor that senses vibrations in the first axis direction, and a second axis sensor that senses vibrations in the second axis direction may be applied to the sensor 110. At this time, the sensor 110 needs to be installed such that the direction of vibrations caused by a knock applied to the door is aligned with the axial direction of the acceleration sensor.

Additionally, the sensor 110 may further include a filter part 115. A vibration sensing signal sensed by the sensor 110 may include unnecessary noise in addition to a vibration sensing signal caused by a knock input. The filter part 115 may remove the noise.

Further, the sensor 110 may further include an amplification part 117. A signal that is output after the filter part 115 removes noise may be amplified by the amplification part 117. The amplified signal may be input to the sensor micom 113.

The sensor micom 113 may be configured in addition to the controller 200. The sensor micom 113 may determine whether vibrations sensed by the sensor 110 are vibrations caused by a knock input by the user, based on a signal output from the amplification part 117. When determining that the vibrations are vibrations caused by a knock input by the user, the sensor micom 113 may transmit information in relation to this to the controller 200.

For example, the sensor micom 113 may determine whether vibrations are caused by a knock, based on results of the comparison of the pattern of a vibration sensing signal generated by the three axes sensor module with the pattern of the predetermined knock signal.

The sensor micom 113 may extract a vibration sensing signal in the predetermined first direction among vibration sensing signals in the three directions. The sensor micom 113 may determine whether vibrations are caused by a knock, by using the extracted vibration sensing signal in the first direction. This is because vibrations caused by a knock are produced in the first direction.

Additionally, when the vibration sensing signal in the first direction is input at the magnitude of a first predetermined threshold or greater and then a vibration sensing signal in the same direction is input at the magnitude of a second predetermined threshold or greater within a predetermined range of time, the sensor micom 113 may determine that vibrations sensed by the sensor 110 are vibrations caused by a knock.

Ordinarily, a knock is applied in the form of "knock knock", and vibrations corresponding to "knock knock" are indicated as a signal having magnitude greater than that of vibrations caused by another factor. Accordingly, when a vibration sensing signal corresponding to "knock knock is respectively at the magnitude of the first threshold and the second threshold or greater, the sensor micom 113 may determine that vibrations sensed by the sensor 110 are vibrations caused by a knock.

Further, the sensor micom 113 may extract a vibration sensing signal in any one axis direction (the first axis direction) aligned with the direction of vibrations caused by the knock, among vibration sensing signals in the three axes directions. The sensor micom 113 may determine whether vibrations are caused by a knock, based on results of the comparison of the extracted vibration sensing signal with the vibration sensing signals in the two other axes directions (the second and third axes directions).

For example, when a maximum value of the vibration sensing signal in at least one of the second axis direction or the third axis direction is greater than a maximum value of the vibration sensing signal in the first axis direction, the sensor micom 113 may determine that vibrations sensed by the sensor 110 are not vibrations caused by a knock.

When receiving a signal (hereafter, a "knock-on signal"), corresponding to vibrations caused by a knock, from the sensor 110, specifically, the sensor micom 113, the controller 200 may turn on/off the lamp 70, based on the signal.

In the embodiment, the three axes sensor module 111 and the sensor micom 113 may be mounted on a signal PCB substrate, and together with the PCB substrate, configured as a sensor 110 in the form of an integrated module. Additionally, in the case of a sensor 110 further including the filter part 115 and the amplification part 117, the sensor may be embodied as an integrated module-type sensor 110 where the three axes sensor module 111, the sensor micom 113, the filter part 115 and the amplification part 117 are mounted on a single PCB substrate.

Since the sensor 110 is formed as an integrated module, the sensor 110 may be easily installed, and the position of the installation of the sensor 110 may vary. The sensor 110 may be easily disposed at a supporter 160 of the support assembly 150 that is described hereafter.

The support assembly 150 may be installed in or at the main body 10 and support the sensor 110, and transfer vibrations, transferred through the transfer member 130, to the sensor 110. The support assembly 150 may include a supporter 160, and a supporter holder 170.

The supporter 160 may be provided to support and/or accommodate or at least partly surround the sensor 110. The supporter holder 170 may be installed in or at the main body 10. The supporter holder 170 may support the supporter 160 in a way that the posture of the supporter 160 changes. Hereafter, the structure of each of the components of the first sensing module 110 including the support assembly 150 is described specifically.

[Structure of Contactor and Input Switch]

Figure 8:
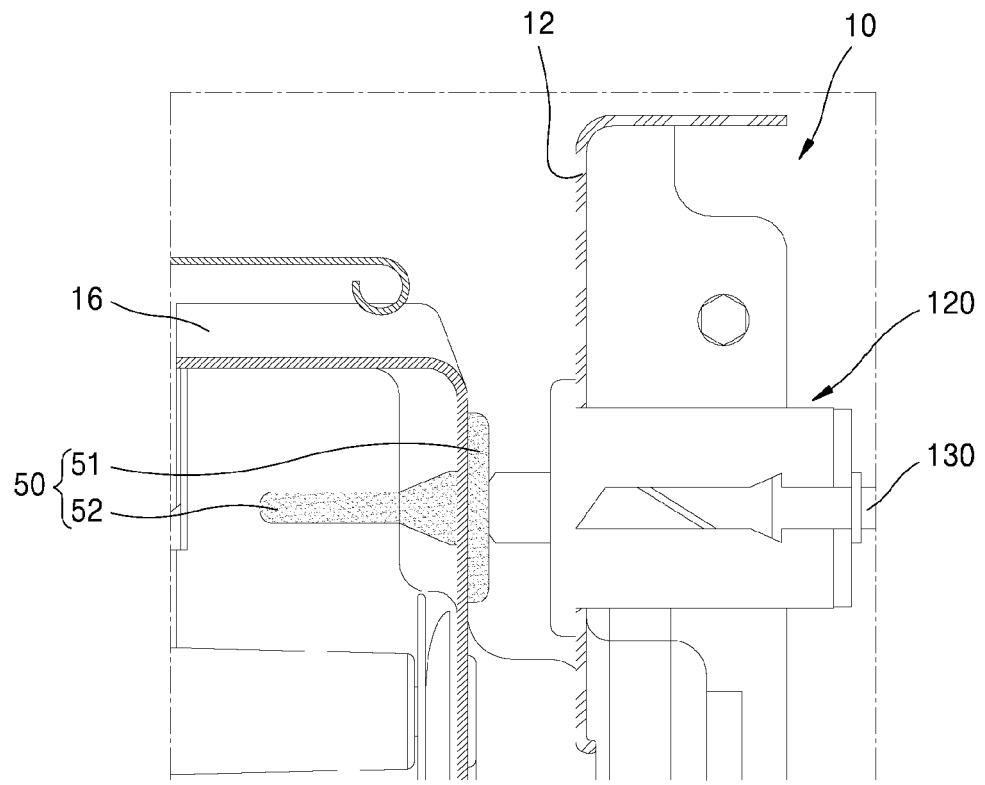
FIG. 8 is a side cross-sectional view illustrating the state in which a contactor and an input switch have been installed according to an embodiment of the present disclosure.
Figure 9:
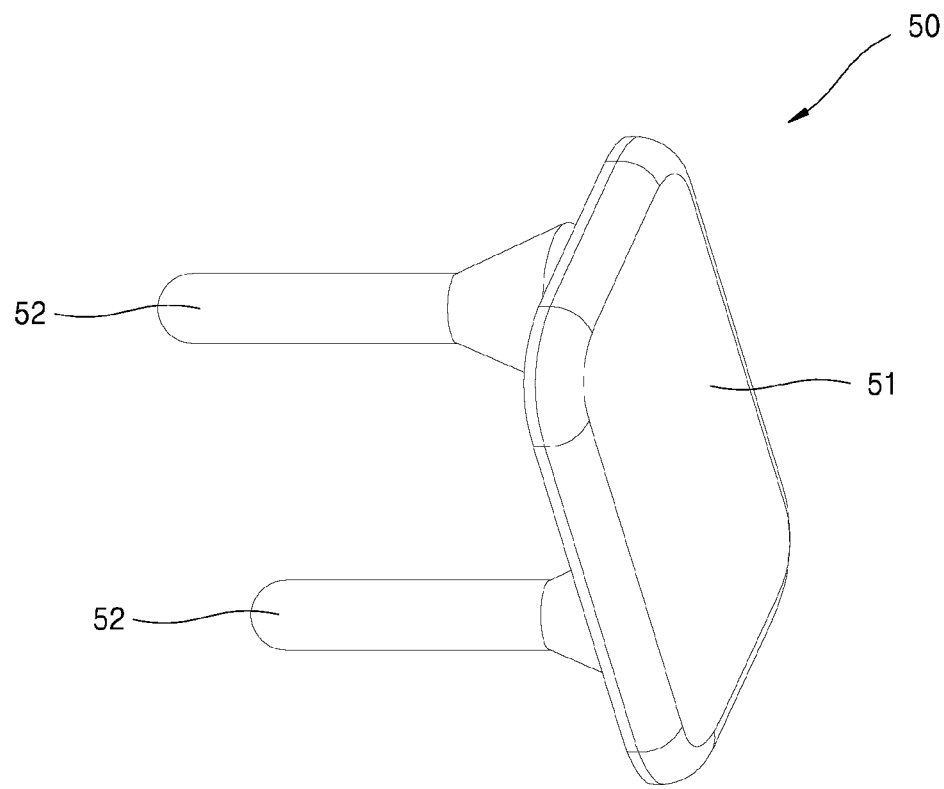
FIG. 9 is a front perspective view illustrating that the contactor illustrated in FIG. 8 has been separated.
Figure 10:
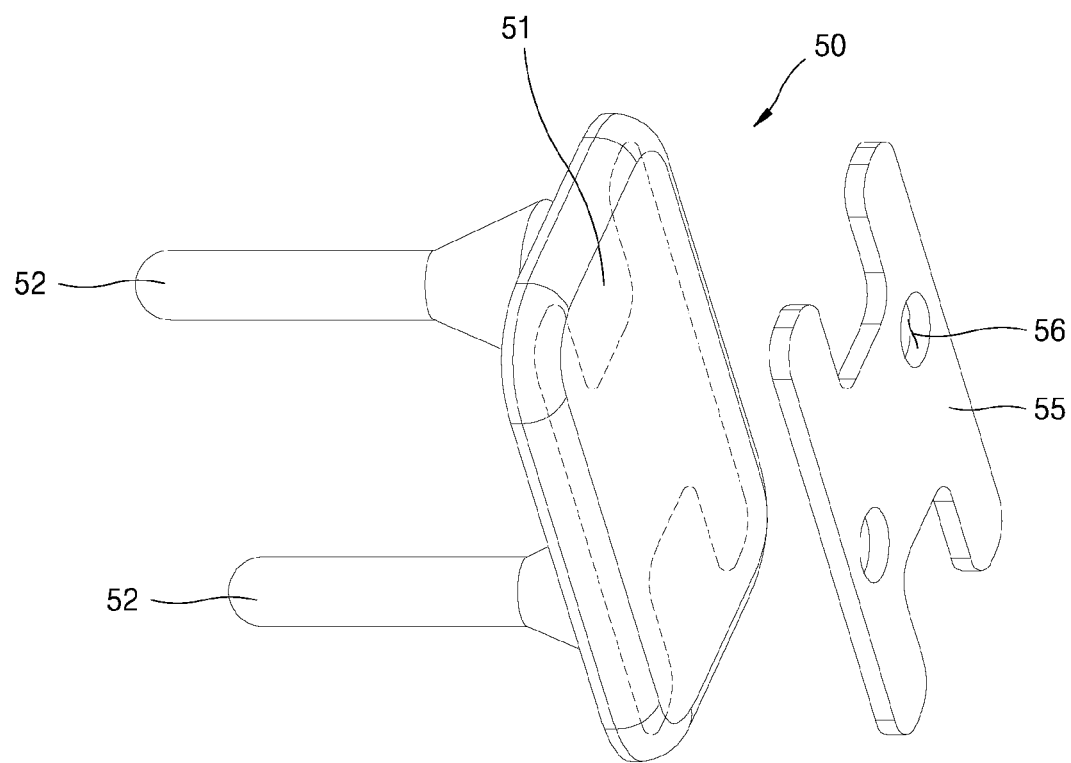
FIG. 10 is a front perspective view illustrating that a support body has been separated from the contactor illustrated in FIG. 9.
Figure 12:
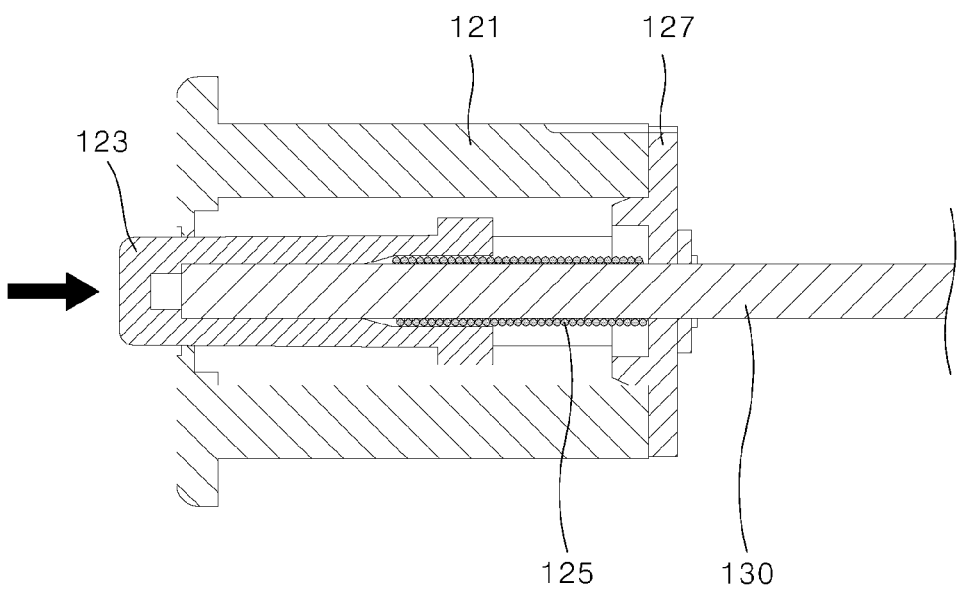
FIG. 12 is a cross-sectional view illustrating the state in which the input switch illustrated in FIG. 13 has been pressed.

FIG. 8 is a side cross-sectional view illustrating the state in which a contactor 50 and an input switch 120 have been installed according to an embodiment of the present disclosure. FIG. 9 is a front perspective view illustrating that the contactor illustrated in FIG. 8 has been separated. FIG. 10 is a front perspective view illustrating that the support body has been separated from the contactor illustrated in FIG. 9. FIG. 11 is a cross-sectional view illustrating an internal structure of the input switch according to an embodiment of the present disclosure. FIG. 12 is a cross-sectional view illustrating the state in which the input switch illustrated in FIG. 13 has been pressed.

Referring to FIGS. 2, 3, and 8, the input switch 120 is installed in or at the front panel 12. At least a part of the input switch 120 may be disposed between the front panel 12 and the door 16, and may be exposed toward the door 16. The a part of the input switch 120 may pass through the front panel 12 and may be exposed to at the front panel 12 to be contacted when the door 16 when the is closed.

Furthermore, as illustrated in FIGS. 8 to 10, the appliance of the present embodiment may further include a contactor 50. The contactor 50 may be installed in the door 16, in particular at a surface of the door facing the front panel 12. At least a part of the contactor 50 may be disposed between the main body 10 and the door 16, more specifically, between the front panel 12 and the door 16.

The contactor 50 is installed in the door 16 in a way to receive the vibration of the door 16. The vibration transferred to the contactor 50 may be transferred to the input switch 120 that has come into contact with the contactor 50. That is, the vibration of the door 16 may be transferred to the input switch 120 through the contactor 50.

The contactor 50 may be brought into contact with the front panel 12 or the input switch 120 when the door 16 closes the cooking space 15 or when the door 16 is closed. The contactor 50 may be formed of an elastically deformable material. For example, the contactor 50 may be formed of a soft rubber or silicon material. The contactor 50 formed as described above can reduce an impact and noise occurring when the front panel 12 or the input switch 120 and the contactor 50 come into contact with each other. Due to the deformable material a reliable transfer of the vibrations to the input switch 120 and the transfer member 130 is provided.

For example, the contactor 50 may include a contactor main body 51 and a fitting projection 52.

The contactor main body 51 is a portion that is exposed to the rear side of the door 16, and may form a panel parallel to the rear surface of the door 16. When the door 16 closes the cooking space 15, the front panel 12 or the input switch 120 may be brought into contact with the contactor main body 51.

The fitting projection 52 may protrude from the contactor main body 51 to the front side. The fitting projection 52 may penetrate the door 16 from the rear side of the door 16, and may be fit into the door 16. The contactor 50 may be coupled with the door 16 by the fitting coupling between the fitting projection 52 and the door 16.

The plurality of fitting projections 52 may be provided in the contactor 50. Accordingly, fitting coupling between the fitting projection 52 and the door 16 is performed at a plurality of points. The contactor 50 can be stably coupled with the door 16.

Further, the appliance of the present embodiment may further include a support body 55. The support body 55 may be inserted into the contactor 50. At least a part of the contactor 50, more specifically, at least a part of the contactor main body 51 may be disposed between the input switch 120 and the support body 55.

That is, the support body 55 is inserted into or fixed at the contactor 50, and may be disposed in a position that may be brought into contact with the input switch 120. The support body 55 may play a role of improving efficiency that the vibration of the door 16 is transferred to the input switch 120.

To this end, the support body 55 may be formed of a material having higher strength than that of the contactor 50. For example, the support body 55 may be formed of a metal material having high strength. The support body 55 is not deformed by an impact or vibration that is applied to the door 16, and can transfer vibration applied to the door 16 very efficiently without any change.

The contactor 50 and the support body 55 may be formed of one member in an insert injection way. A penetration hole 56 may be formed in the support body 55 in a way to penetrate the support body 55 back and forth. The penetration hole 56 may form, in the support body 55, a passage through which resin that forms the contactor 50 passes through the inside of the support body 55 upon insert injection operation.

Accordingly, the resin that forms the contactor 50 may penetrate the inside of the support body 55 through the penetration hole 56 while surrounding the support body 55 from the outside thereof, and may be coupled with the support body 55. Accordingly, the support body 55 can be stably fixed within the contactor 50.

The contactor 50 that accommodates the support body 55 therein as described above can effectively transfer, to the input switch 120, vibration applied to the door 16, while reducing an impact and noise occurring when the input switch 120 and the door 16 or the contactor 50 come into contact with each other.

The input switch 120 provided on the side of the main body 10 may be supported by the front panel 12. At least a part of the input switch 120 may be disposed between the front panel 12 and the contactor 50, and may be exposed toward the contactor 50.

Referring to FIGS. 8 and 11, the input switch 120 may include a switch holder 121, and a moving member 123.

The switch holder 121 may form the exterior of the input switch 120, and have an accommodation space for accommodating the moving member 123 therein. In the embodiment, the switch holder 121 is formed as a lying cylinder, for example. The switch holder 121 has a hollow hole therein, and the end portion of the front of the switch holder 121 may be open forward.

The switch holder 121 may be disposed on the front panel 12. At this time, the open end portion of the front of the switch holder 121 may be exposed toward the front of the front panel 12, and most of the area of the switch holder 121 except for the open end portion of the switch holder 121 may be disposed in an area of the rear of the front panel 12, i.e., in the second accommodation space or the component room 30.

The moving member 123 may be installed in the switch holder 121 in a way to allow a movement in the front-rear direction. The moving member 123 may interlock with the movement of the door 16 and move rearward, when the door 16 is approaching the front panel 12.

For example, the moving member 123 may be installed in the switch holder 121 in a way that at least a portion of the moving member 123 protrudes toward the fronts of the switch holder 121 and the front panel 12. At this time, the moving member 123 may protrude toward the front of the front panel 12 to the extent that the moving member 123 contacts the door 16 as the door 16 closes the first accommodation space. The moving member 123 may be pushed by the door 16 having closed the first accommodation space and moved rearward by a predetermined distance.

The transfer member 130 may be connected to the moving member 123 and move in the front-rear direction together with the moving member 123. For example, the transfer member 123 may be fitted and coupled to the moving member 123, and interlock with the movement of the moving member 123 and move in the front-rear direction.

The input switch 120 may further include a first elastic member 125. The first elastic member 125 may be provided to elastically support the moving member 123 at the rear of the moving member 123.

The moving member 123 may be kept protruding to the front of the front panel 12 toward the door 16 by the first elastic member 125. Additionally, the moving member 123 may be kept contacting the door 16 closely by elastic force provided by the first elastic member 125.

Additionally, the moving member 123 pushed and moved rearward by the door 16 may return to the front, using elastic force provided by the first elastic member 125.

For example, the first elastic member 125 may be provided in the form of a coil spring. Additionally, the input switch 120 may further include a support cover 127. The support cover 127 is disposed at the rear of the switch holder 121 and support the first elastic member 125 at the rear.

The end portion of the front of the first elastic member 125 in the form of a coil spring may be coupled to the moving member 123. The end portion of the rear of the first elastic member 125 may be supported by the support cover 127. The input switch 120 may further include a coupling member. The coupling member may be provided to couple the support cover 127 to the switch holder 121.

In the embodiment, the switch holder 121 is formed as a lying cylinder, both sides of which are open in the front-rear direction, and the support cover 127 covers the open end portion of the rear of the switch holder 121, for example. The coupling member may couple the support cover 127 to the switch holder 121 such that the support cover 127 does not separate from the switch holder 121.

For example, the coupling member may be provided as a metallic member that is coupled to the lateral surface of the switch holder 121 in the state of encircling the rear surface of the support cover 127 and the lateral surface of the switch holder 121.

In the embodiment, the input switch 120 may be disposed in a position appropriate enough to receive vibrations caused by a knock input to the door 16. That is, the input switch 120 may be disposed on the front panel 12, which is closest position among the main body 10 to the door 16 onto which a knock input is applied.

When the input switch 120 is adjacent to the door 16, noise is much less likely to be mixed as vibrations caused by a knock input applied to the door 16 are transferred to the input switch 120 than when a large number of components are fitted between the door 16 and the input switch 120.

That is, since the input switch 120 is adjacent to the door 16 as described, vibrations caused by a knock input applied to the door 16 may only be transferred to the input switch 120 at a high level of purity. Then accuracy in the sensor 110's sensing of a knock may improve.

Furthermore, vibration by a knock input applied to the door 16 is transferred to the contactor 50. The support body 55 inserted into the contactor 50 may contribute to the efficient transfer of the vibration by the knock input.

[Schematic Structure of Support Assembly]

Figure 13:
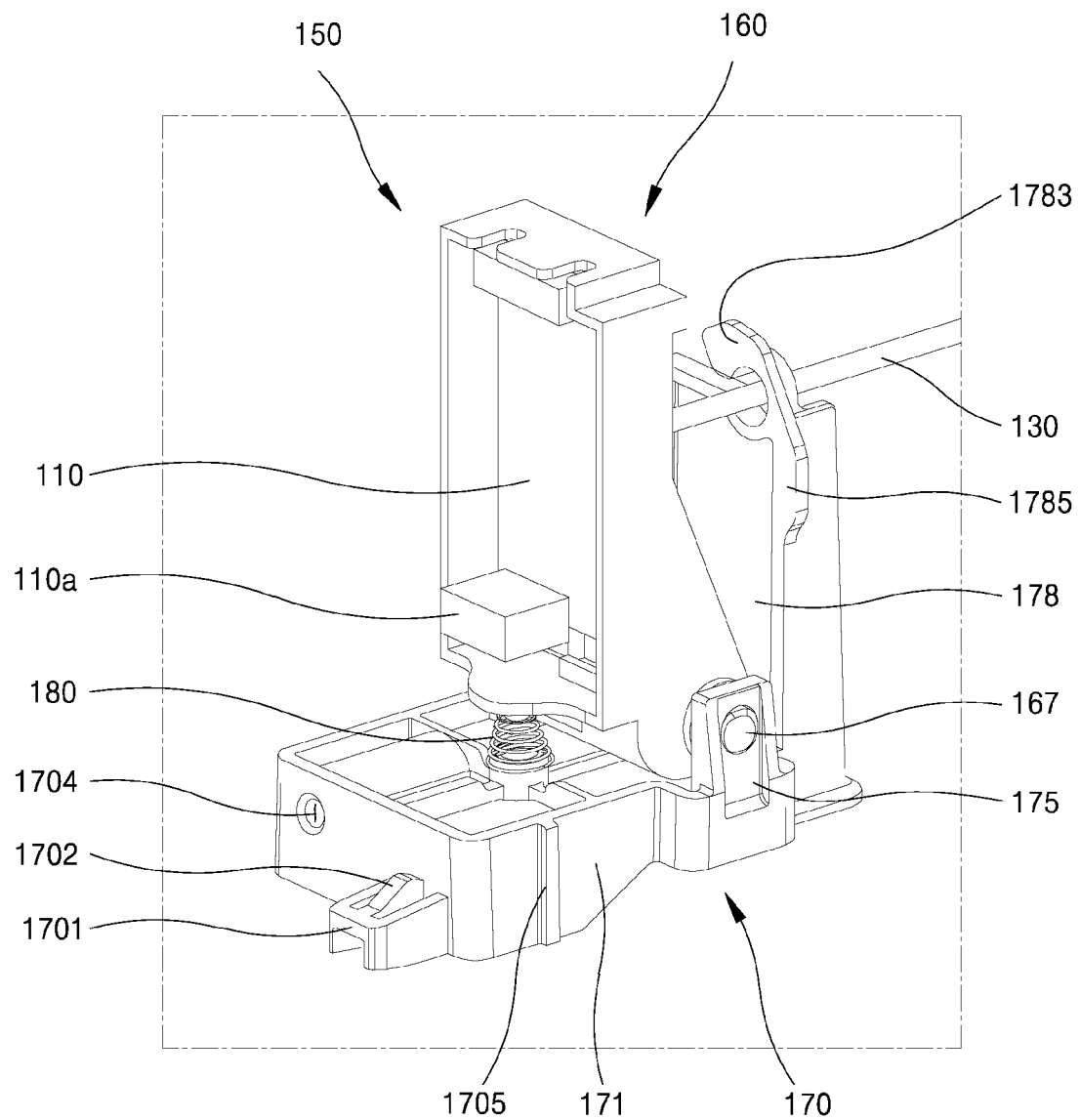
FIG. 13 is a perspective view illustrating a support assembly according to an embodiment of the present disclosure.
Figure 14:
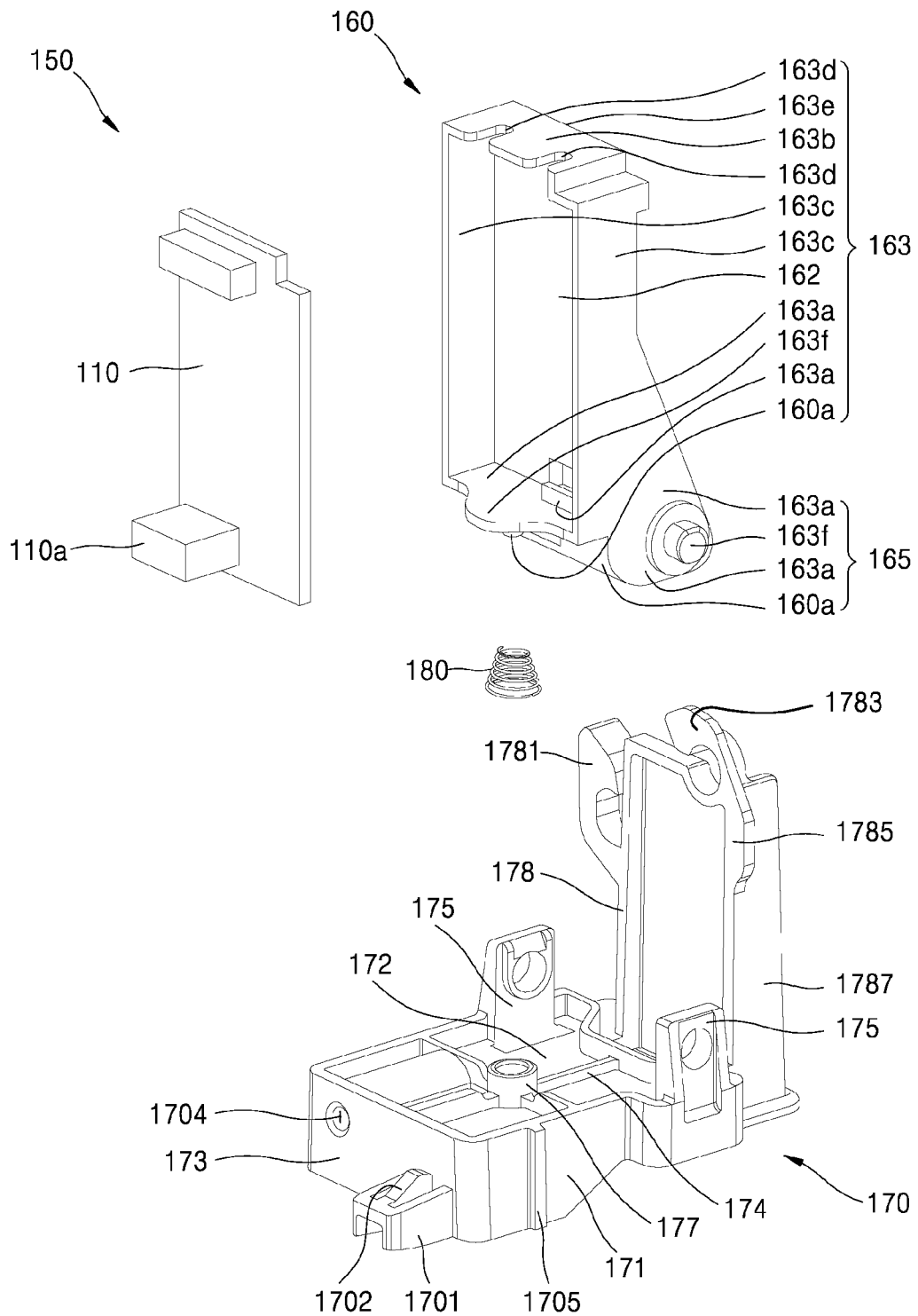
FIG. 14 is an exploded perspective view illustrating that the construction of the support assembly illustrated in FIG. 13 has been separated.
Figure 15:
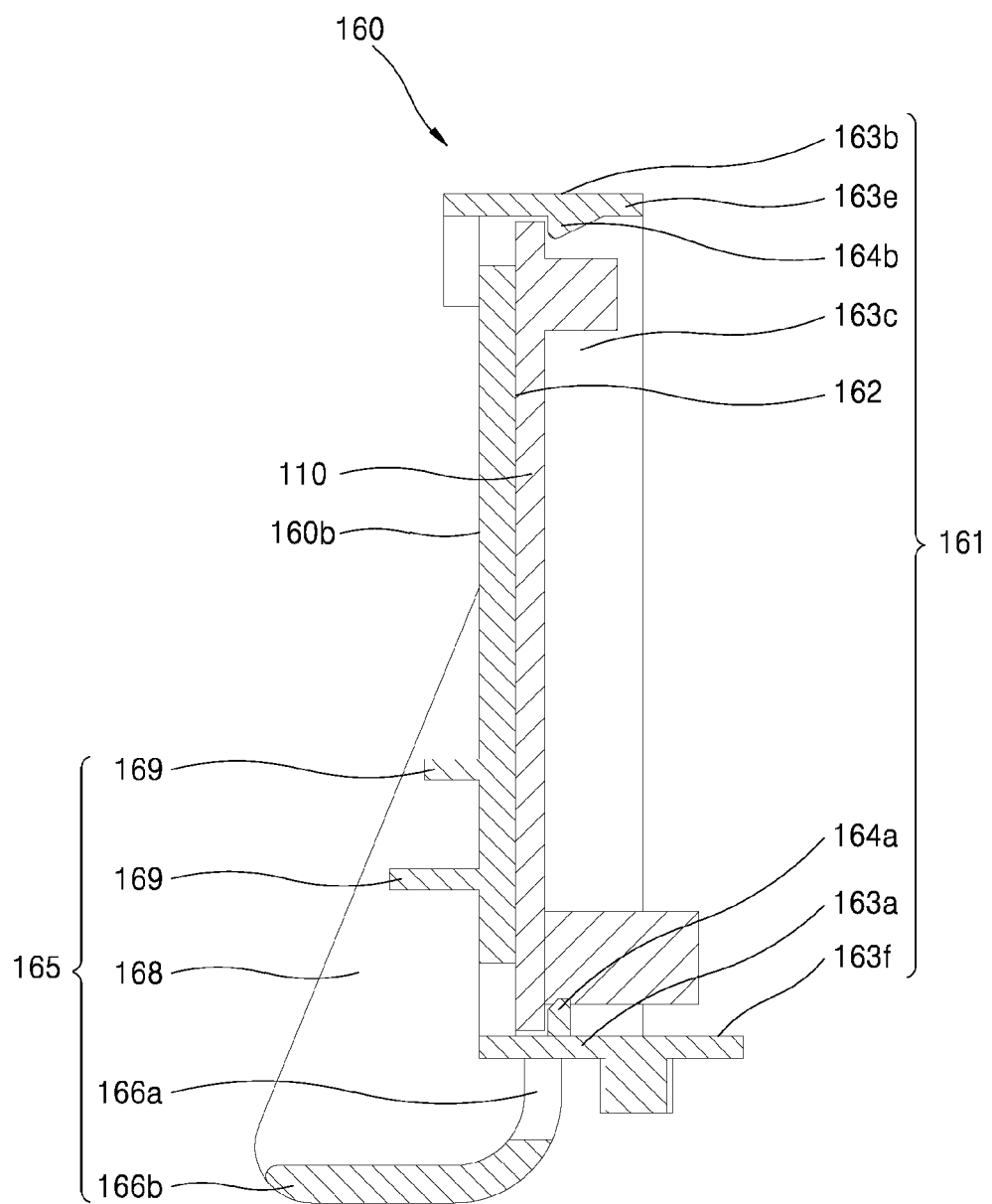
FIG. 15 is a side cross-sectional view illustrating an internal structure of the supporter illustrated in FIG. 13.
Figure 16:
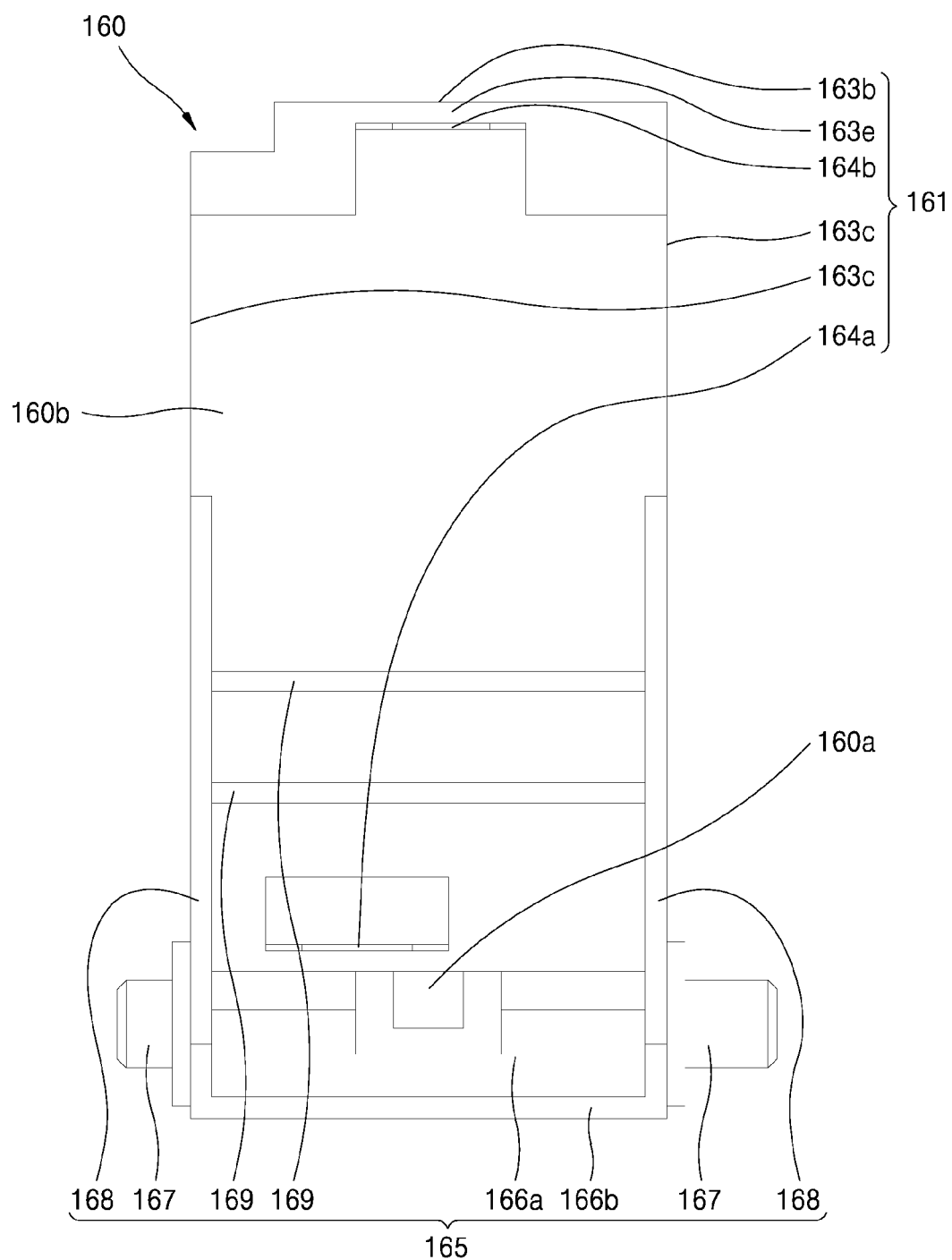
FIG. 16 is a front view illustrating the front of the supporter illustrated in FIG. 13.
Figure 17:
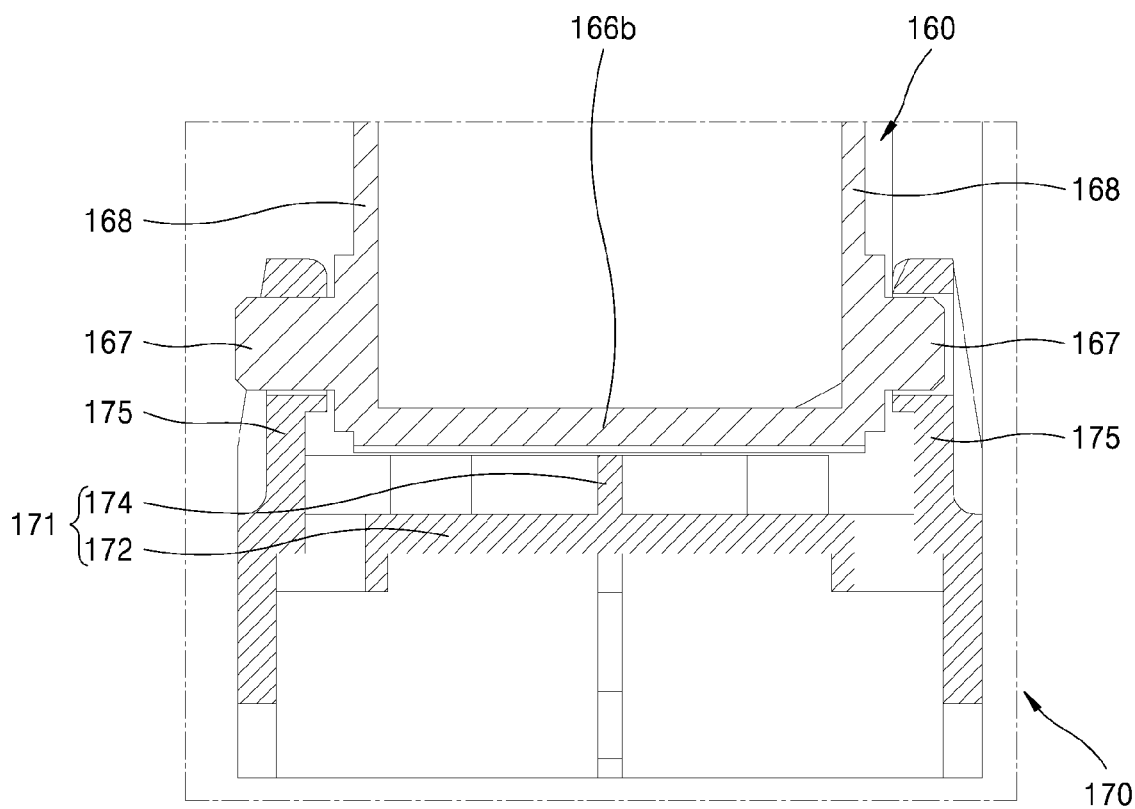
FIG. 17 is a front cross-sectional view illustrating a structure in which the supporter and the supporter holder illustrated in FIG. 13 are coupled.
Figure 18:
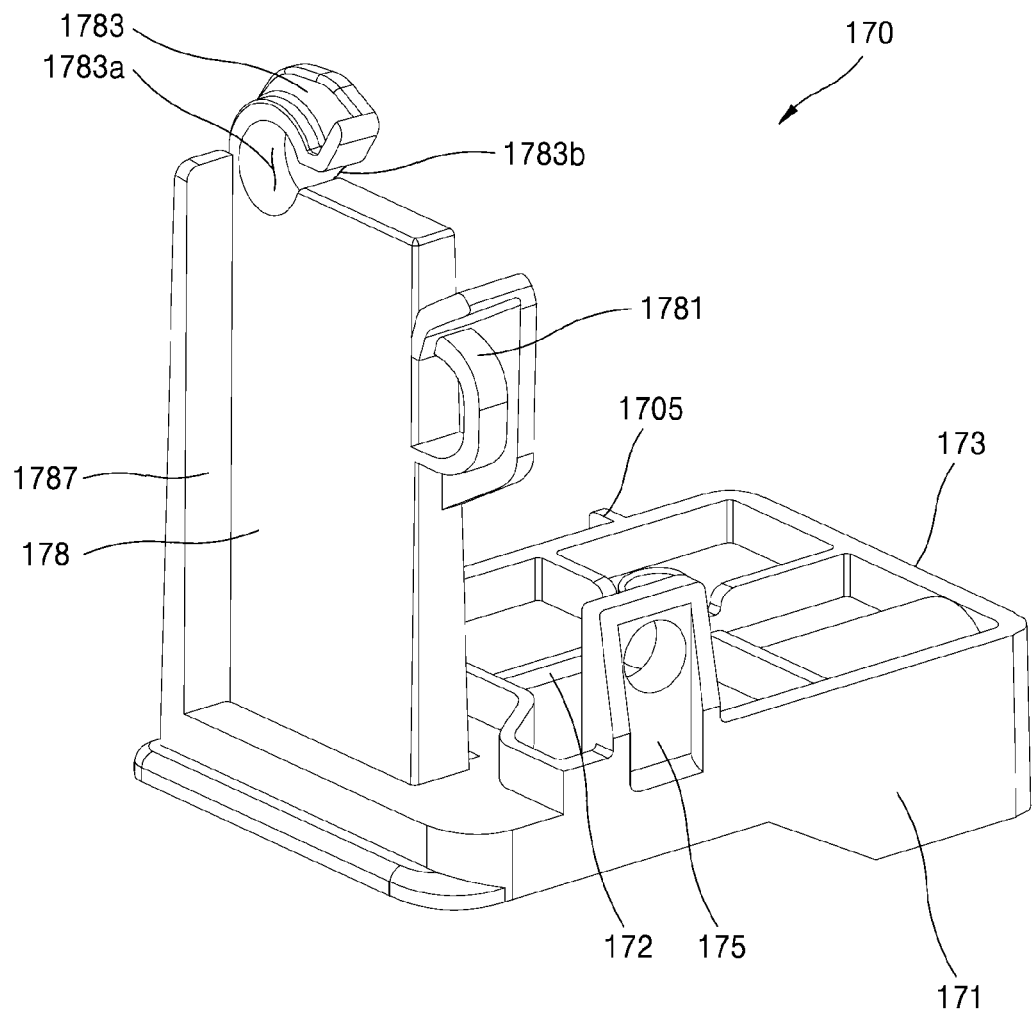
FIG. 18 is a rear surface perspective view illustrating that a supporter holder illustrated in FIG. 13 has been separated.
Figure 19:
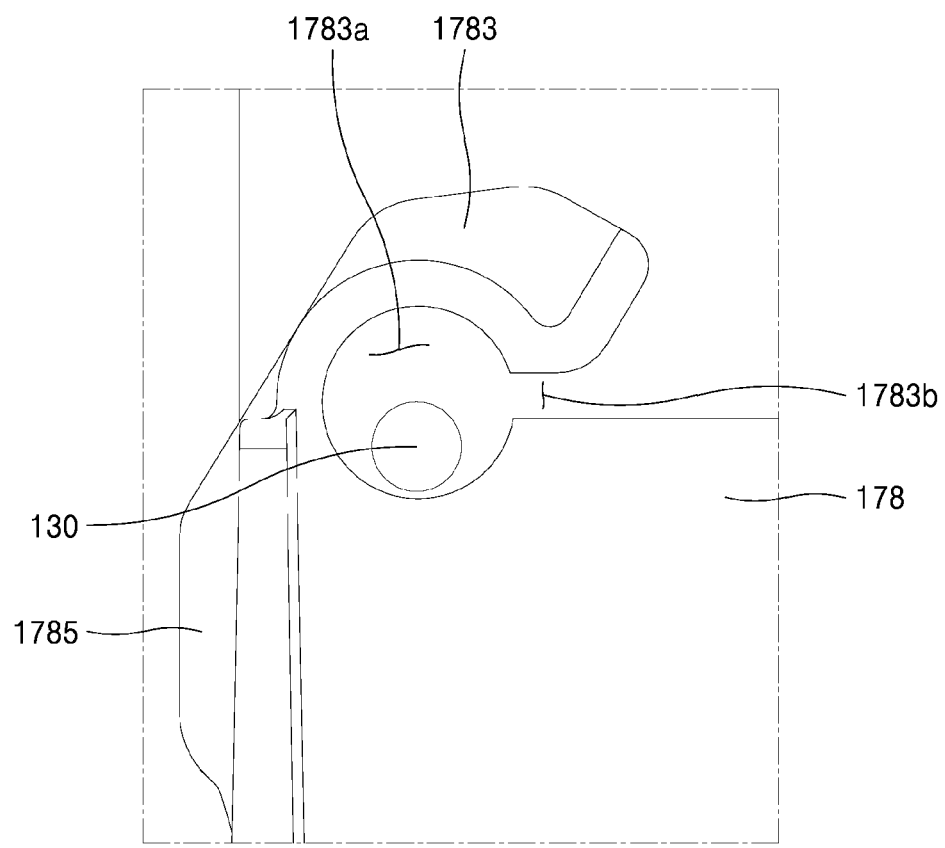
FIG. 19 is a front view illustrating that a part of the supporter holder illustrated in FIG. 13 has been enlarged.

FIG. 13 is a perspective view illustrating a support assembly according to an embodiment of the present disclosure. FIG. 14 is an exploded perspective view illustrating that the construction of the support assembly illustrated in FIG. 13 has been separated. FIG. 15 is a side cross-sectional view illustrating an internal structure of the supporter illustrated in FIG. 13. FIG. 16 is a front view illustrating the front of the supporter illustrated in FIG. 13. FIG. 17 is a front cross-sectional view illustrating a structure in which the supporter and the supporter holder illustrated in FIG. 13 are coupled. FIG. 18 is a rear surface perspective view illustrating that the supporter holder illustrated in FIG. 13 has been separated. FIG. 19 is a front view illustrating that a part of the supporter holder illustrated in FIG. 13 has been enlarged.

Referring to FIGS. 13 and 14, the support assembly 150 may be installed on the rear side of the main body 10. The support assembly 150 may support the sensor 110 and include the supporter 160 and the supporter holder 170.

The supporter 160 is provided to be capable of supporting the sensor 110. The supporter 160 is provided so that the posture or inclination thereof may be changed by the vibration of the door 16 transferred by the transfer member 130. A position of the sensor 110 in the front-rear direction thereof may be changed in conjunction with such a change in the posture of the supporter 160.

The supporter holder 170 is installed in the main body 10, and may support the supporter 160 so that the posture of the supporter 160 can be changed. The supporter holder 170 may support the supporter 160 so that the supporter 160 is rotated around a left-right axis thereof.

[Structure of Supporter]

Referring to FIGS. 14 to 17, the supporter 160 may include a sensor support part 161 and a rotation support part 165.

The sensor support part 161 corresponds to an area of the supporter 160, which supports the sensor 110. The sensor support part 161 may include a rear support surface 162.

The rear support surface 162 is a surface that supports the PCB substrate, between the PCB substrate on which the sensor 110 is mounted and the transfer member 130. The rear support surface 162 may have a flat surface shape corresponding to the flat surface shape of the PCB substrate. For example, the PCB substrate and the rear support surface 162 may be respectively formed as a rectangular flat surface. The PCB substrate on which the sensor 110 is mounted may be coupled to the sensor support part 161 while closely contacting the rear support surface 162.

The sensor support part 161 may further include side walls 163*a*, 163*b*, 163*c*. The side walls 163*a*, 163*b*, 163*c* may extend from the edges of the rear support surface 162 in a direction orthogonal to the rear support surface 162.

The side wall 163*a*, 163*b*, 163*c* may be disposed at each of the edges of the rear support surface 162. The side walls 163*a*, 163*b*, 163*c* may surround the rear support surface 162 outside the rear support surface 162, e.g., from the outside in the up-down direction and the left-right direction.

The PCB substrate on which the sensor 110 is mounted may be accommodated in a space surrounded by the rear support surface 162 and the side walls 163*a*, 163*b*, 163*c*, and coupled to the sensor support part 161.

For example, the rear support surface 162 may be formed into a rectangular flat surface, and a coupling body of the rear support surface 162 and the side walls 163*a*, 163*b*, 163*c* may have a space therein and be formed as a cuboid, the front of which is open.

The sensor support part 161 may further include a fastening projection 164*a*, 164*b*. The fastening projection 164*a*, 164*b* may protrude from the side wall. The PCB substrate may be detachably coupled to the sensor support part 161 while being fitted between the rear support surface 162 and the fastening projection 164*a*, 164*b*.

The fastening projection 164*a*, 164*b* may include a first fastening projection 164*a* and a second fastening projection 164b. The first fastening projection 164a may be disposed at the lower end of the sensor support part 161, and the second fastening projection 164b may be disposed at the upper end of the sensor support part.

The first fastening projection 164a may protrude from a lower side wall 163a disposed at the lower end of the sensor support part 161, among the side walls 163a, 163b, 163c. The first fastening projection 164a may be spaced a predetermined distance apart from the rear support surface 162 and protrude from the lower side wall 163a.

For example, the first fastening projection 164a may be spaced from the rear support surface 162 by a distance corresponding to the thickness of the PCB substrate. The PCB substrate and the supporter 160 may be coupled to each other while a portion of the lower side of the PCB substrate is fitted between the rear support surface 162 and the first fastening projection 164a.

Additionally, the first fastening projection 164a may be provided to be elastically deformed in the direction of the thickness of the PCB substrate. The first fastening projection 164a may be spaced from the rear support surface 162 by a distance slightly less than the thickness of the PCB substrate. The first fastening projection 164a may fix the lower side of the PCB substrate to the supporter 160 while pressing the PCB substrate against the rear support surface 162.

The second fastening projection 164b may protrude in the form of a hook from an upper side wall 163b disposed at the upper end of the sensor support part 161, among the side walls 163a, 163b, 163c. The second fastening projection 164b may be spaced a predetermined distance apart from the rear support surface 162, and protrude from the upper side wall 163b.

The upper side wall 163b may have a slit part 163d. The slit part 163d may be formed in a way that a portion of the upper side wall 163b is slit in a parallel direction with the direction in which the upper side wall 163b protrudes. For example, the slit part 163d may be formed in a way that a portion of the upper side wall 163b is cut rearward from the end portion of the front of the upper side wall 163b.

The upper side wall 163b may have a pair of slit parts 163d. The pair of slit parts 163d may be spaced in the left-right direction with the second fastening projection 164d therebetween. Accordingly, a portion of the upper side wall 163b, disposed between the pair of slit parts 163d, may be deformed in the up-down direction.

In the embodiment, a portion (hereafter, a "cut surface") of the upper side wall 163b, disposed between the pair of slit parts 163d, may be elastically deformed, while being deformed in the up-down direction.

For example, the cut surface may be elastically deformed in the up-down direction with respect to the end portion of the front of the cut surface, adjacent to the rear support surface 162. The cut surface may serve as a body that supports the second fastening projection 164b. That is, the cut surface may be provided in the form of a hook body that forms a hook member together with the second fastening projection 164b formed into a hook projection.

In the embodiment, the PCB substrate and the supporter 160 may be coupled while a portion of the upper side of the PCB substrate is fitted between the rear support surface 162 and the second fastening projection 164b. At this time, the PCB substrate may pass through the area where the second fastening projection 164b may be disposed while pushing the second fastening projection 164b upward, and fitted between the rear support surface 162 and the second fastening projection 164b.

Additionally, the PCB substrate fitted between the rear support surface 162 and the second fastening projection 164b may separate from the supporter in the state in which the second fastening projection 164b bends upward.

The PCB substrate, as described above, may be detachably coupled to the supporter 160 by the second fastening projection 164b and the hook member including the cut surface. To this end, the hook member may be elastically deformed by the pair of slit parts 163d formed on the upper side wall 163b.

Further, the sensor support part 161 may further include a contact surface 160b. The contact surface 160b may be provided as a surface that contacts the transfer member 130 on the opposite side of the rear support surface 162.

For example, the contact surface 160b may be the back surface of the rear support surface 162 provided on the same member as the contact surface 160b. That is, on a single member constituting the supporter 160, the contact surface 160b may form the front surface of the member, and the rear support surface 162 may form the rear surface of the member.

The supporter 160 may further include an extension part 163e. The extension part 163e may extend forward from the upper side wall 163b. Because of the extension part 163e, the upper side wall 163b may protrude further rearward than the rear support surface 162. In other words, the upper side wall 163b may protrude further rearward than the other side walls 163a, 163c by the length of the extension part 163e.

As a result, the front-to-rear length of the upper side wall 163b may increase, and the front-to-rear length of the cut surface formed on the upper side wall 163b may also increase. An increase in the front-to-rear length of the cut surface results in an increase in the length of the hook body in the hook member.

As the length of the hook body in the hook member increases, the width of the up-to-down deformation of the hook member, specifically, the width of the up-to-down movement of the second fastening projection 164b may further increase. Accordingly, since the hook member, and the second fastening projection 164b forming the hook member may bend further upward, the PCB substrate may be attached and detached more readily and reliably.

The rotation support part 165 may be provided to couple the sensor support part 161 to the supporter holder 170 in a way that sensor support part 161 rotates in the front-rear direction. The rotation support part 165 may include a support leg 166a, 166b and a pair of rotation projections 167.

The support leg 166a, 166b may protrude from the rear support surface 162 rearward and downward. In the embodiment, the support leg 166a, 166b includes a first leg part 166a and a second leg part 166b, for example. The first leg part 166a may protrude from the lower end of the rear support surface 162 downward. The second leg part 166b may extend from the lower end of the first leg part 166a rearward.

In the embodiment, the first leg part 166a and the second leg part 166b connect to each other in the form of "L", for example. In the state in which the sensor support part 161 and the supporter holder 170 are spaced apart from each other in the up-down direction, the first leg part 166a may extend from the sensor support part 161 toward the supporter holder 170. The second leg part 166b may form a flat surface approximately parallel with the upper surface of the supporter holder 170, specifically, the flat surface formed by a support surface 172 that is described hereafter.

The pair of rotation projections 167 may protrude respectively from one side and the other side of the support leg 166a, 166b in the left-right direction. Each of the rotation projections 167 may be rotatably coupled to the supporter holder 170. For example, each of the rotation projections 167 may be rotatably coupled to the supporter holder 170, specifically, a rotation projection supporter 175 that is described hereafter, in the front-rear direction.

The rotation support part 165 may further include a side support surface 168. The side support surface 168 may be formed into a flat surface that connects the rear support surface 162 or the contact surface 160b with the support leg 166a, 166b at both sides of the rear support surface 162 or the contact surface 160b in the left-right direction.

For example, the side support surface 168 may formed into a flat surface that connects to the rear support surface 162 or the contact surface 160b and the first leg part 166a and the second leg part 166b. The upper end of the side support surface 168 may connect to the rear support surface 162 or the contact surface 160b.

Additionally, the rear end of the side support surface 168 may connect to the rear support surface 162 or the contact surface 160b and the first leg part 166a. The lower end of the side support surface 168 may connect to the second leg part 166b. The side support surface 168, as described above, may connect to the rear support surface 162 or the contact surface 160b and the support leg 166a, 166b. When viewed from the side, the side support surface 168 may be formed into an approximate triangle.

The side support surface 168 may be disposed respectively at both sides of the supporter 160 in the left-right direction. That is, the supporter 160 may include a pair of side support surfaces 168. The side support surface 168, provided as described above, may improve the rigidity of the supporter 160.

Additionally, the side support surface 168 may help to suppress the occurrence of the bend of the support leg 166a, 166b, in particular, the second leg part 166b.

As the supporter 160 rotates further forward or rearward in the state in which the second leg part 166b contacts the supporter holder 170, external force that bends the second leg part 166b upward may be applied to the second leg part 166b. The side support surface 168 may support the second leg part 166b at both sides, to prevent the bend of the second leg part 166b caused by the external force.

Further, the side support surface 168 may limit a range of the left-to-right movement of the transfer member 130 such that the transfer member 130 contacting the contact surface 160b does not escape from the contact surface 160b in the left-right direction of the contact surface 160b.

The rotation support part 165 may further include a side rib 169. The side rib 169 may protrude from the contact surface 160b forward. The rotation support part 165 may include a plurality of side ribs 169. Each of the side ribs 169 may be formed in a way that extends transversely.

The side rib 169, provided as described above, is a protruding structure formed on the supporter 160 and helps to improve the strength of the supporter 160.

Additionally, the side rib 169 may be disposed under the area where the contact surface 160b and the transfer member 130 usually contact each other. The side rib 169 may support the transfer member 130 from below. The side rib 169 may prevent the transfer member 130 from being pushed excessively downward on the contact surface 160b in the process in which the transfer member 130 pushes the supporter 160 while contacting the contact surface 160b.

[Structure of Supporter Holder]

Referring to FIGS. 13 to 14, 17 to 18, the supporter holder 170 may support the supporter 160 in a way that the supporter 160 may rotate around the left-to-right axis. So, the supporter 160 may be rotated in front rear direction around the left right axis. In the embodiment, the supporter holder 170 includes a holder main body 171 and a rotation projection supporter 175, for example.

The holder main body 171 may form the skeleton of the supporter 160 and be coupled to the rear of the cavity 11. The holder main body 171 may be disposed under the supporter 160.

A support surface 172 may be formed at the upper side of the holder main body 171, which faces the supporter 160. For example, the support surface 172 may be formed into a rectangular flat surface disposed transversely.

The holder main body 171 may be provided with a coupling surface 173. The coupling surface 173 is a portion that is used to couple the supporter holder 160 to the rear surface of the cavity 11. The coupling surface 173 may be formed into a flat surface disposed on the front surface of the holder main body 171.

Additionally, the holder main body 171 may be provided with an upper rib 174. The upper rib 174 may protrude upward from the support surface 172. For example, the upper rib 174 may be formed in a grid pattern on the upper surface of the holder main body 171.

As a protruding structure formed on the holder main body 171, the upper rib 174 may help to improve the strength of the supporter holder 170. Additionally, the upper rib 174 may support a second elastic member 180 described hereafter, and limit the range of movement of the supporter 160 by contacting the support leg 166a,166b to control a range of the swivel of the supporter 160.

The support assembly 150 may further include the second elastic member 180. The second elastic member 180 may be provided to elastically support the supporter 160 under the supporter 160.

The second elastic member 180 may keep the supporter 160 biased forward toward the door 16. At this time, the upper end of the supporter 160 may be kept biased further forward than the lower end of the supporter 160 adjacent to the rotation center of the supporter 160.

For example, the second elastic member 180 may be provided in the form of a coil spring. The upper end of the second elastic member 180 in the form of a coil spring may be coupled to the supporter 160, and the lower end of the second elastic member 180 may be coupled to the supporter holder 170.

Additionally, the second elastic member 180 in the form of a coil spring may be spaced rearward from the rotation center of the supporter 160. That is, the second elastic member 180 may be spaced rearward from the rotation projection 167. For example, the second elastic member 180 may be biased toward the end portion of the rear of the supporter 160.

The supporter holder 170 may further include a first spring support part 177, and the sensor support part 161 may further include a second spring support part 160a.

The first spring support part 177 may protrude from the holder main body 171 upward and support the lower end of the second elastic member 180. In the embodiment, the first spring support part 177 may be disposed at the point where the upper rib 174 are crossed in the "+" shape, and at the point, formed into a cylinder that protrudes upward.

The lower end of the second elastic member 180 in the form of a coil spring may be mounted on the upper rib 174 around the first spring support part 177 while surrounding the first spring support part 177 from the outside in the diameter direction. The lower end of the second elastic member 180 may actually be supported by the upper rib 174. The first spring support part 177 may be fitted into the second elastic member 180.

The second spring support part 160a may protrude downward from the lower side wall 163a disposed at the lower end of the sensor support part 161 and support the upper end of the second elastic member 180. In the embodiment, the sensor support part 161 may further include a protruding surface part 163. The protruding surface part 163f may protrude rearward from the lower side wall 163a.

In the embodiment, the protruding surface part 163f protrudes in the semi-circle shape corresponding to the posterior half shape of the second elastic member 180 or the posterior half shape of the second spring support part 160a, while protruding rearward from the lower side wall 163a, for example.

The second sprig support part 160a may be formed into a cylinder that extends downward from the lower side wall 163a. At least a portion of the second spring support part 160a may protrude from the protruding surface part 163f and be disposed further rearward then the lower side wall 163a. That is, the second spring support part 160a may be biased rearward from the supporter 160 as much as the protruding surface part 163f protrudes.

The upper end of the second elastic member 180 in the form of a coil spring may closely contact the protruding surface part 163f and the lower side wall 163a while surrounding the second spring support part 160a from the outside in the diameter direction. The upper end of the second elastic member 180 may actually be supported by the protruding surface part 163f and the lower side wall 163a. The second spring support part 160a may be fitted into the second elastic member 180.

As the supporter 160 rotates rearward, the second elastic member 180 may be pressed while the upper end of the second elastic member 180 moves downward. The second elastic member 180 pressed downward may provide elastic force for rotating the supporter 160 forward again as the supporter 160 is released from external force of rotating the supporter 160 rearward.

That is, the supporter 160 may rotate in the front-rear direction, and the second elastic member 180 may be pressed or extend in the up-down direction.

The elastic force provided by the second elastic member 180 may allow the supporter 160 to contact the transfer member 130 closely.

The second elastic member 180 may also be formed into a circular truncated cone the diameter of which increases toward its lower portion, while being formed into a coil spring.

In the embodiment, basically, the supporter 160 rotates in the front-rear direction, and the second elastic member 180 is pressed or extend in the up-down direction. The second elastic member 180 coupled to the supporter 160 is affected by the supporter 160 that moves in the front-rear direction. Accordingly, the second elastic member 180 may be deformed in the front-rear direction that is the rotation direction of the supporter 160 as well as in the up-down direction that is the press/extension direction.

Considering the fact, the second elastic member 180 may be provided in the form of a coil spring having a circular truncated cone shape the diameter of which increases toward its lower portion. The second elastic member 180 formed into a circular truncated cone-shaped coil spring may suppress the problem that occurs when the upper lateral surface and the lower lateral surface of the second elastic member 180 are jammed and caught mutually while contacting each other in the process of repetitive rotation of the supporter 160, and the like.

The second elastic member 180, formed as describe above, has a bottom surface expanded further than that of an ordinary coil spring, thereby stably being coupled to the supporter 160 holder and reliably supporting the supporter 160.

Further, the support leg 166a, 166b may serve as a stopper that controls the range of the rotation of the supporter 160. For example, the second leg part 166b may be spaced from the upper end of the holder main body 171 by a first distance. Specifically, the second leg part 166b may be spaced from the upper rib 174 by the first distance.

The first distance is defined as a gap between the second leg part 166b and the upper rib 174 when the second leg part 166b and the upper rib 174 are disposed in parallel. When the second leg part 166b and the upper rib 174 are spaced by the first distance, the second leg part 166b does not contact the upper rib 174. However, when the supporter 160 rotates rearward by a first rotation angle or rotates forward by a second rotation angle, the rearward rotation or the forward rotation of the supporter 160 may be limited, while the second leg part 166b interferes with the holder main body 171, i.e., the upper rib 174.

The first rotation angle may be properly determined depending on a limited range of the rearward rotation of the supporter 160, and the second rotation angle may be properly determined depending on a limited range of the forward rotation of the supporter 160, which will be limited. Additionally, the first distance may be properly determined within the range where the rotation of the supporter 160 is limited by the first rotation angle and the second rotation angle.

In conclusion, the range of the rotation of the supporter 160 may be limited by the support leg 166a, 166b and the upper rib 174. That is, as the supporter 160 rotates rearward by the first rotation angle, the rearward rotation of the supporter 160 may be limited while the second leg part 166b interferes with the upper rib 174, and as the supporter 160 rotates forward by the second rotation angle, the forward rotation of the supporter 160 may be limited while the second leg part 166b interferes with the upper rib 174.

A rotation projection support 175 may be provided in order to couple the supporter 160 with the supporter holder 170 in a way to be rotatable. A rotation projection 167 may be coupled with the rotation projection support 175 in a way to be rotatable in the front-rear direction of the rotation projection support 175.

For example, a pair of rotation projection supports 175 may be provided in the supporter holder 170. The pair of rotation projection supports 175 may be disposed in a way to be spaced apart from each other at given intervals in the lateral direction thereof.

For example, the rotation projection supports 175 may be disposed at both ends of the holder main body 171, respectively, in the lateral direction thereof. That is, the pair of rotation projection supports 175 may be disposed in a way to be spaced apart from each other in the lateral direction thereof with the holder main body 171 interposed therebetween.

Each of the rotation projection supports 175 may be formed to protrude upward from the holder main body 171. In the state in which the supporter 160 has been inserted between the pair of rotation projection supports 175 provided as described above, a pair of rotation projections 167 provided in the supporter 160 may be coupled with the pair of rotation projection supports 175 in a way to be rotatable in the front-rear direction thereof.

Accordingly, the supporter 160 may be installed in the supporter holder 170 in a way to be rotatable in the front-rear direction thereof.

[Structure of Supporter Holder—2]

The supporter holder 170 may further include a front wall 178. The front wall 178 protrudes upward from the holder main body 171, and may be disposed on the front side of the supporter 160. For example, the supporter holder 170 may protrude upward from the end of the holder main body 171 on the front side thereof, and may form the surface of a wall that covers the supporter 160 on the front side thereof.

The sensor 110 may be connected to the controller 200 (refer to FIG. 4) through a harness or cable or electrical wire (not illustrated). Further, the supporter holder 170 may further include a harness support part 1781. The harness support 1781 may be provided in order to support the harness and to regulate positions of the harness in the lateral direction and up-down direction thereof.

The harness support part 1781 may protrude from the front wall 178 to a lateral direction thereof. The harness support part 1781 may be disposed on the side higher than a connection portion 110*a* of the sensor 110 and the harness.

For example, the harness support part 1781 may be formed to protrude from the front wall 178 in an "L" shape. The harness support part 1781 supports the harness upward from the lower side of the harness, but may support the harness at a position higher than the connection portion 110*a* of the sensor 110 and the harness.

The harness connected to the sensor 110 may be provided in the form of a wire bundle that includes a plurality of electric wires. Such a harness may apply weight to the supporter 160 to the extent that the weight may affect a movement of the supporter 160 that supports the sensor 110.

For example, even though the vibration of the door 16 transferred through the transfer member 130 has to change a position of the supporter 160, the position of the supporter 160 may not be properly changed due to the weight of the harness that is connected to the sensor 110.

In order to prevent such a problem, the harness support part 1781 of the present embodiment may support the harness at a position higher than the connection portion 110*a* of the sensor 110 and the harness. If the harness is supported at such a position, the weight of the harness applied to the connection portion 110*a* of the sensor 110 and the harness is reduced. Accordingly, the weight of the harness applied to the supporter 160 can be reduced.

If the height of the harness support part 1781 at which the harness is supported is properly adjusted, the sensor 110 and the supporter 160 may be rarely affected by the weight of the harness. Accordingly, the harness support part 1781 can effectively prevent the occurrence of a problem in that an operation of changing the posture of the supporter 160 is influenced by the harness.

Furthermore, as the weight of the harness applied to the connection portion 110*a* of the sensor 110 and the harness is reduced as described above, there can be provided an effect in that a connection between the sensor 110 and the harness is stably maintained.

Figure 20:
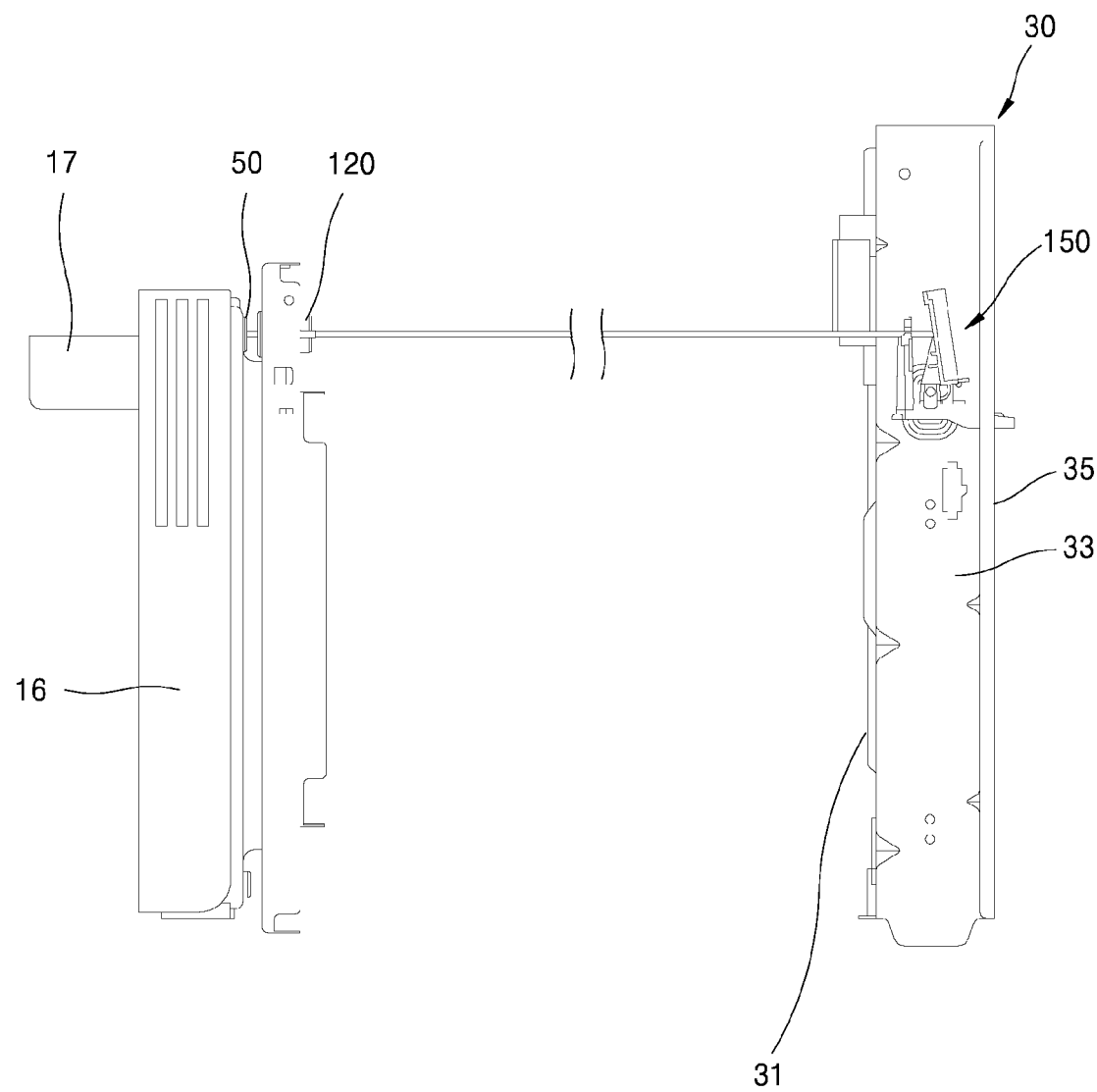
FIG. 20 is a side view schematically illustrating the state in which the first sensing module has been installed according to an embodiment of the present disclosure.

FIG. 20 is a side view schematically illustrating the state in which the first sensing module has been installed according to an embodiment of the present disclosure.

Referring to FIGS. 13, 14, and 18 to 20, the supporter holder 170 may further include a load support part 1783. The load support part 1783 protrudes from the front wall 178, and may be disposed in the moving path of the transfer member 130.

The load support part 1783 may support the transfer member 130 in a way to be movable back and forth. For example, the transfer member 130 passes through the load support part 1783, and may connect the input switch 120 and the supporter 160. The load support part 1783 may support the transfer member 130 in a way to be movable.

The load support part 1783 may be formed in a form that protrudes upward from the front wall 178. Further, the front wall 178 may be disposed at a position lower than the moving path of the transfer member 130. At least a part of the load support part 1783 that protrudes from the front wall 178 may be disposed at a position higher than the moving path of the transfer member 130.

A passage hole 1783*a* may be provided in the load support part 1783. The passage hole 1783*a* may be formed in the load support part 1783 in a way to penetrate the load support part 1783 back and forth. The transfer member 130 may pass through the load support part 1783 through the passage hole 1783*a*.

For example, most areas of the passage hole 1783*a* may penetrate the load support part 1783. A part of the passage hole 1783*a* on the lower side thereof may penetrate an upper part of the front wall 178. Accordingly, a general shape of the passage hole 1783*a* may be a circular shape when viewed from the front of the passage hole 1783*a*, and a round groove shape thereof may be formed at the top of the front wall 178.

The load support part 1783 formed as described above may support the transfer member 130 while surrounding the transfer member 130 on the outside thereof in the up-down direction thereof. The load support part 1783 may play a role of suppressing the occurrence of the sagging of the transfer member 130 by upward supporting the transfer member 130 under the transfer member 130.

The transfer member 130 needs to have a very long length that is equal to the length of the entire appliance in the front-rear direction thereof. The reason for this is that the transfer member 130 needs to have a length that is sufficient to transfer vibration, input to the input switch 120 disposed on the foremost side of the main body 10, to the support assembly 150 disposed on the rearmost side of the main body 10.

If the transfer member 130 is formed to have the long length as described above, there is inevitably a higher possibility that the sagging of the transfer member 130 will occur. In particular, although the sagging of the transfer member 130 does not occur when the transfer member 130 is initially installed, there is inevitably a higher possibility that the sagging of the transfer member 130 will occur over time.

If the sagging of the transfer member 130 occurs as described above, a contact point between the transfer member 130 and the supporter 160 may be changed. As a result, an action according to a movement of the transfer member 130 may not be properly incorporated into the supporter 160. For example, in the state in which the transfer member 130 has heavily sagged downward, although the transfer member 130 moves to the rear side thereof, a phenomenon in which the transfer member 130 does not change the posture of the supporter 160 may occur.

In this case, the vibration is not properly transferred to the supporter 160 through the transfer member 130. As a result, a phenomenon in which the sensor 110 does not properly sense the vibration may occur.

By taking such a point into consideration, the present embodiment presents a structure for suppressing the occurrence of the sagging of the transfer member 130 in a way that the load support part 1783 upward supports the transfer member 130.

Since the occurrence of the sagging of the transfer member 130 is suppressed by the load support part 1783, the transfer of the vibration from the transfer member 130 to the supporter 160 can be performed with high accuracy. As a result, the accuracy of the sensing of the vibration by the sensor 110 can be improved.

Furthermore, the load support part 1783 may support the transfer member 130 while surrounding the transfer member 130 on the outside thereof in the lateral direction thereof. The load support part 1783 may play a role of regulating the position of the transfer member 130 in the lateral direction thereof within a range that is permitted by the load support part 1783.

Accordingly, the position of the transfer member 130 in the lateral direction thereof in addition to the position of the transfer member 130 in the up-down direction thereof can be stably maintained. As the position of the transfer member 130 is stably maintained as described above, the transfer of the vibration from the transfer member 130 to the supporter 160 can be performed with higher accuracy.

Furthermore, the load support part 1783 may play a role of providing guidance of the position where the transfer member 130 is installed. That is, the position of the transfer member 130 can be guided to the best position with respect to the supporter 160 if the transfer member 130 has only to be inserted into the load support part 1783.

Accordingly, a task for installing the first sensing module 100 can be performed more easily and rapidly, the accuracy of the results of the installation task can be improved, and the occurrence of a failure can be reduced.

Further, an open hole 1783b may be provided in the load support part 1783. The open hole 1783b may be formed in a form in which the passage hole 1783a is opened in the diameter direction of the passage hole 1783a.

The open hole 1783b plays a role of enabling the transfer member 130 to be installed in the load support part 1783 in the state in which the supporter holder 170 has already been installed in the main body 10. That is, the transfer member 130 may be inserted into the load support part 1783 through the open hole 1783b in the state in which the supporter holder 170 has already been installed in the main body 10.

[Structure of Supporter Holder—3]

Figure 21:
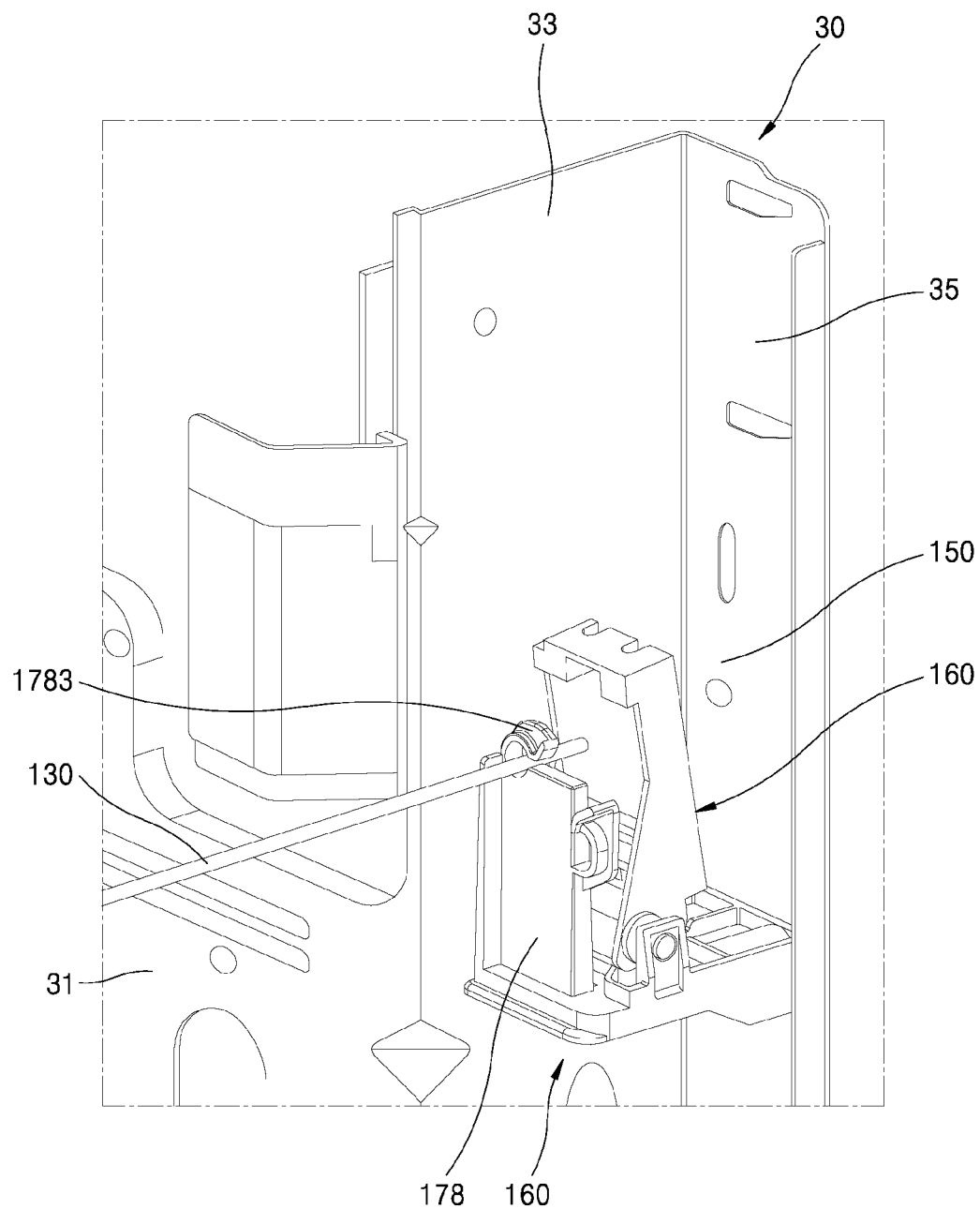
FIG. 21 is a front perspective view illustrating that a rear panel in which the support assembly has been installed has been separated according to an embodiment of the present disclosure.
Figure 22:
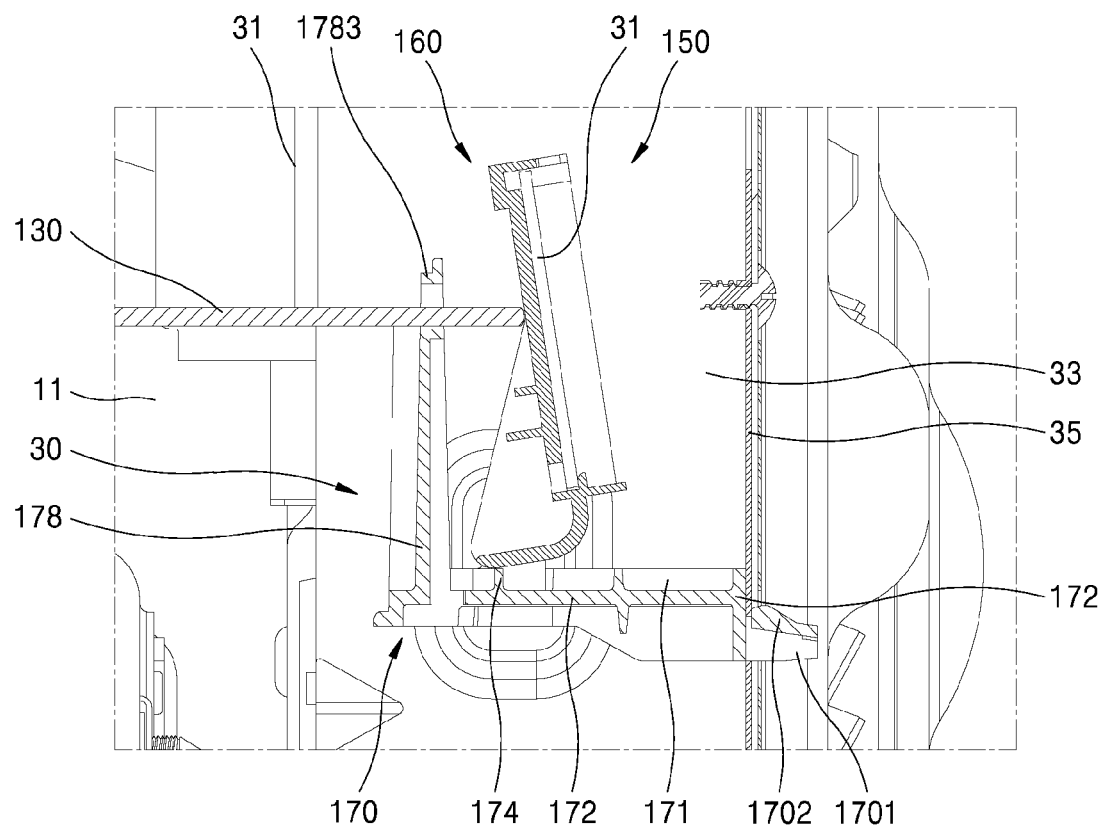
FIG. 22 is a side cross-sectional view illustrating the state in which the support assembly has been installed in the rear panel according to an embodiment of the present disclosure.
Figure 23:
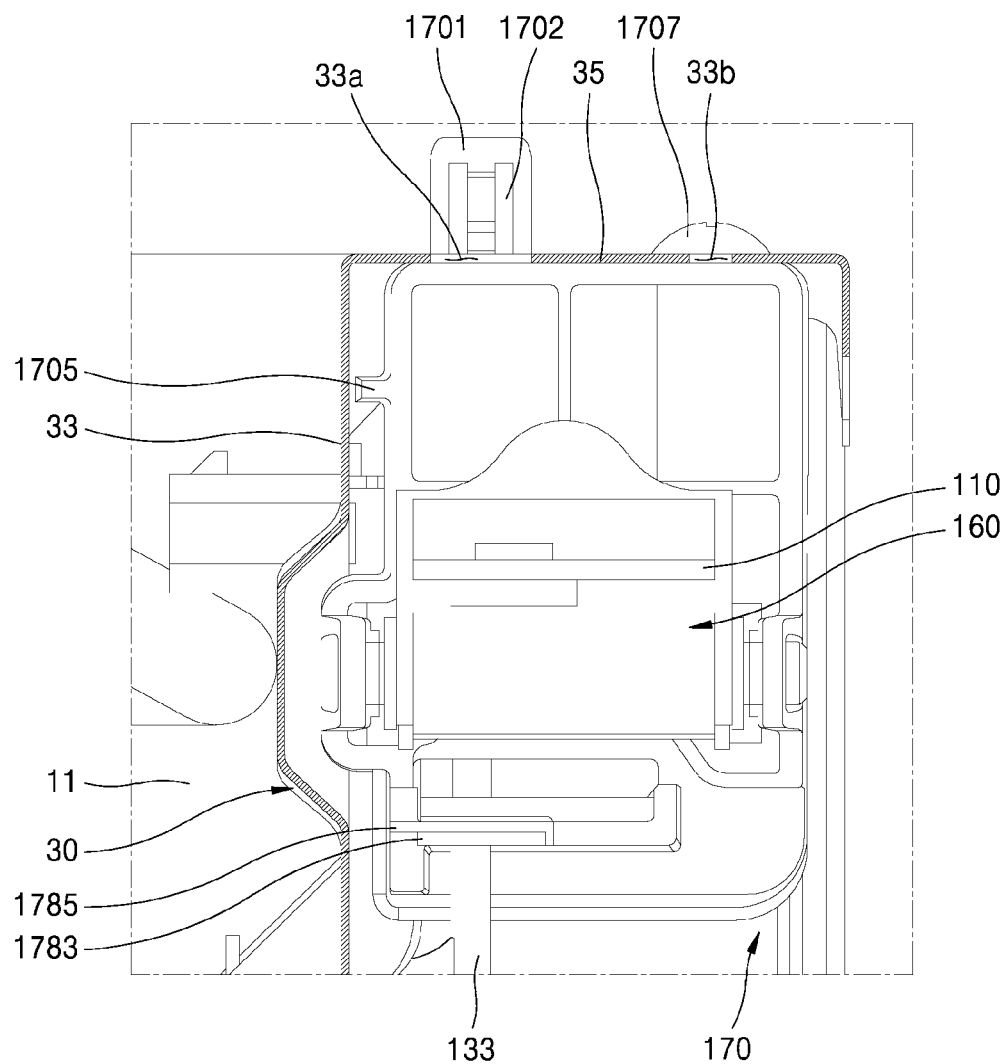
FIG. 23 is a plan cross-sectional view illustrating the state in which the support assembly has been installed in the rear panel according to an embodiment of the present disclosure.

FIG. 21 is a front perspective view illustrating that a rear panel in which the support assembly has been installed has been separated according to an embodiment of the present disclosure. FIG. 22 is a side cross-sectional view illustrating the state in which the support assembly has been installed in the rear panel according to an embodiment of the present disclosure. FIG. 23 is a plan cross-sectional view illustrating the state in which the support assembly has been installed in the rear panel according to an embodiment of the present disclosure.

Referring to FIGS. 20 to 23, the main body 10 may further include a rear panel 30. The rear panel 30 may be disposed on the rear side of the cavity 11. A part, such as a motor provided in the convection part 18 (refer to FIG. 3), a part, such as a pipe for supplying fuel to the convection part 18 and the upper burner 19 (refer to FIG. 3), and the support assembly 150 may be installed in the rear panel 30.

According to the present embodiment, the rear panel 30 may include a panel main body part 31, a first extension part 33, and a second extension part 35.

The panel main body part 31 is disposed at the center of the rear panel 30 in the lateral direction thereof, and occupies most areas of the rear panel 30. The panel main body part 31 may be provided in a form that forms a panel parallel to the rear surface of the cavity 11. For example, the panel main body part 31 may form a plane that is orthogonal to an axis in the front-rear direction thereof.

The first extension parts 33 may be disposed on both sides of the panel main body part 31 in the lateral direction thereof. Each of the first extension parts 33 may form a plane that extends from the end of the panel main body part 31 in the lateral direction thereof to the rear side thereof. The panel main body part 31 and the first extension part 33 may be connected in a "¬" shape when viewed at the top thereof.

The second extension part 35 may form a plane that extends from the first extension part 33 in the lateral direction thereof. Such a second extension part 35 extends from the end of the first extension part 33 on the rear side thereof in the lateral direction thereof, but may be extended in a direction that becomes distant from the panel main body part 31. The first extension part 33 and the second extension part 35 may be connected in a "⌐" shape when viewed at the top thereof.

Further, the appliance of the present embodiment may further include a cabinet 40. The cabinet 40 may form external appearances of the side and rear surface of the appliance. The cabinet 40 may be provided in a way to cover the cavity 11 and the rear panel 30 on the outside thereof.

For example, the cabinet 40 may be provided in a form that includes a pair of side covers that cover the sides of the cavity 11, respectively, on the outside thereof and a rear surface cover that covers the rear panel 30 on the rear side thereof. The cabinet 40 may be formed in a form in which the pair of side covers and the rear surface cover have been connected in a "⊏" shape. Furthermore, for example, the cabinet 40 may be provided in a form in which the side covers and the rear surface cover are separately provided.

A space that is surrounded by the rear panel 30 and the rear surface of the cabinet 40 may be formed on the rear side of the rear panel 30. The space may be disposed at the rear of the cavity 11.

Specifically, a space that is surrounded by the panel main body part 31, the pair of first extension parts 33, and the rear surface of the cabinet 40 may be formed on the rear side of the cavity 11.

Various parts installed in the rear panel 30, for example, a part, such as a motor provided in the convection part 18 (refer to FIG. 3), a part, such as a pipe for supplying fuel to the convection part 18 and the upper burner 19 (refer to FIG. 3), the transfer member 130, and the support assembly 150 may be accommodated in the space.

Further, a space that is surrounded by the side of the cavity 11, the rear panel 30, and the side of the cabinet 40 may be formed on the front side of the rear panel 30. Such spaces may be formed on both sides of the cabinet 40, respectively, in the lateral direction thereof. The transfer member 130 and the support assembly 150 may be disposed in the spaces formed as described above. Furthermore, the supporter 160 may be connected to the transfer member 130 in the space formed as described above.

Specifically, a space that is surrounded by the side of the cavity 11, the first extension part 33, the second extension part 35, and the side of the cabinet 40 may be formed in a side part of the cavity 11. The transfer member 130 and the support assembly 150 may be disposed in the space that is formed in the side part of the cavity 11 as described above.

For example, the supporter holder 170 may be coupled with the first extension part 33. A first fastening hole 33a and a second fastening hole 33b may be provided in the first extension part 33. The first fastening hole 33a and the second fastening hole 33b may be formed in the first extension part 33 in a way to penetrate the first extension part 33 back and forth.

According to the present embodiment, the supporter holder 170 may further include a fastening projection 1701. The fastening projection 1701 may be provided for coupling between the support assembly 150 and the main body 10, more specifically, coupling between the supporter holder 170 and the rear panel 30. The fastening projection 1701 may be formed in a form that protrudes from the holder main body 171 to the rear side thereof.

The fastening projection 1701 may be inserted into the first extension part 33 through the first fastening hole 33a. For example, the fastening projection 1701 may protrude in a hexahedral shape from a coupling surface 173 that faces the first extension part 33. Further, the first fastening hole 33a may be formed in a rectangular shape that corresponds to a shape of the rear surface of the fastening projection 1701.

The fastening projection 1701 may penetrate the first extension part 33 through the first fastening hole 33a on the front side of the first extension part 33, and may be inserted into the first extension part 33. Fitting coupling between the supporter holder 170 and the rear panel 30 can be performed by fitting coupling between the fastening projection 1701 and the first extension part 33, which is performed as described above.

Furthermore, the supporter holder 170 may further include a hook projection 1702. The hook projection 1702 may protrude to the outside of the fastening projection 1701. In the present embodiment, the hook projection 1702 has been illustrated as being formed to protrude upward from the top of the fastening projection 1701.

The hook projection 1702 may be provided in a way to be elastically deformable in the direction in which the hook projection 1702 appears and disappears from the fastening projection 1701. For example, the hook projection 1702 may be provided in a way to be elastically deformable in the up-down direction thereof.

The hook projection 1702 may be inserted into the fastening projection 1701 when being downward pressurized, and may return to its original state in which the hook projection 1702 protrudes over the fastening projection 1701 when the pressurization is released.

A top surface of the hook projection 1702 may be formed as an inclined plane the protruding height of which is decreased toward the rear side of the inclined plane.

When the fastening projection 1701 moves toward the front side thereof and passes through the first fastening hole 33a, the hook projection 1702 may pass through the first fastening hole 33a along with the fastening projection 1701. In this case, the hook projection 1702 may pass through the first fastening hole 33a while sliding on the rear panel 30 by using the inclined plane of the hook projection 1702.

When the hook projection 1702 fully passes through the first fastening hole 33a, the hook projection 1702 returns to the original state, and a front surface of the hook projection 1702 is caught in the rear panel 30. Accordingly, as the movement of the fastening projection 1701 in the front-rear direction thereof is limited, the state in which the fastening projection 1701 has been subjected to fitting coupling with the rear panel 30 may be maintained.

The coupling between the fastening projection 1701 and the rear panel 30, which is performed as described above, may play a role of providing guidance of the position where the supporter holder 170 is installed and may play a role of temporarily fixing the supporter holder 170 to the rear panel 30 in a process of installing the support assembly 150 in the main body 10.

According to the present embodiment, a third fastening hole 1704 may be provided in the holder main body 171. The third fastening hole 1704 may be formed in a coupling surface 173 in a way to penetrate the coupling surface 173 back and forth.

The third fastening hole 1704 is formed in a way to be capable of communicating with the second fastening hole 33b formed in the rear panel 30. Preferably, when the fastening projection 1701 and the rear panel 30 have a coupling state, the third fastening hole 1704 may be disposed at a position where the third fastening hole 1704 may communicate with the second fastening hole 33b.

Furthermore, the supporter holder 170 may further include a fastening member 1707. For example, the fastening member 1707 may include a screw. The fastening member 1707 may penetrate the first extension part 33 and the holder main body 171 through the second fastening hole 33b and the third fastening hole 1704, and may couple the rear panel 30 and the supporter holder 170.

According to the present embodiment, a task for installing the support assembly 150 in the main body 10 may be performed in a way that the supporter holder 170 is temporarily fixed to the rear panel 30 by first inserting the fastening projection 1701 into the rear panel 30 through the first fastening hole 33a, and then the supporter holder 170 is fixed to the rear panel 30 by using the fastening member 1707.

Preferably, the fastening projection 1701 and the third fastening hole 1704 may be disposed in a way to be spaced apart from each other at given intervals in the lateral direction thereof. Accordingly, the coupling of the supporter holder 170 and the rear panel 30 may be performed at a plurality of points in the lateral direction. Accordingly, the support assembly 150 can be stably installed in the main body 10.

The supporter holder 170 that is installed in the rear panel 30 as described above according to the present embodiment can provide effects in that a task for installing the support assembly 150 in the main body 10 can be performed easily and rapidly and the support assembly 150 can be installed in a form in which the support assembly 150 has been stably fixed at an accurate position.

The supporter holder 170 of the present embodiment may further include a first lateral projection 1785. The first lateral projection 1785 may be formed in a form that protrudes from the front wall 178 to the first extension part 33. At least a part of the first lateral projection 1785 may be disposed between the first extension part 33 and the supporter 160 in the lateral direction of the supporter holder 170.

Furthermore, the supporter holder 170 of the present embodiment may further include a second lateral projection 1705. The second lateral projection 1705 may be formed in a form that protrudes from the holder main body 171 to the first extension part 33. At least a part of the first lateral projection 1785 may be disposed between the first extension part 33 and the supporter 160 in the lateral direction of the supporter holder 170.

The supporter holder 170 may include only any one of the first lateral projection 1785 and the second lateral projection 1705, and may include both the first lateral projection 1785 and the second lateral projection 1705. The present embodiment exemplifies that the supporter holder 170 includes both the first lateral projection 1785 and the second lateral projection 1705.

The first lateral projection 1785 and the second lateral projection 1705 may play a role of isolating the supporter 160 and the sensor 110 supported by the supporter 160 from the side of the rear panel 30, that is, from the first extension part 33 at given intervals.

When cooking is performed in the cooking appliance, a temperature of the cavity 11 may rise to a very high temperature. The rear panel 30 is disposed very close to the cavity 11. The first extension part 33 that is disposed very close to the cavity 11 may be greatly influenced by heat that is generated from the cavity 11.

The first extension part 33 may be expanded by the influence of the heat generated from the cavity 11. Accordingly, if a shape of the first extension part 33 is deformed, a temperature of the sensor 110 may rise as a distance between the heated first extension part 33 and the sensor 110 is reduced.

The sensor 110, that is, an electronic part, is vulnerable to heat. Accordingly, when the temperature of the sensor 110 rises, there may be a problem in that the sensor 110 may malfunction or the accuracy of an operation of the sensor 110 is reduced.

According to the present embodiment, the first lateral projection 1785 and the second lateral projection 1705 may protrude from the supporter holder 170 in the lateral direction thereof. Specifically, the first lateral projection 1785 and the second lateral projection 1705 may protrude from the front wall 178 or the holder main body 171 to the first extension part 33.

The first lateral projection 1785 and the second lateral projection 1705 may play a role of preventing the distance between the first extension part 33 and the sensor 110 from being reduced although the first extension part 33 is expanded by the heat, by preventing the first extension part 33 from approaching toward the sensor 110.

In this case, the first lateral projection 1785 may isolate the first extension part 33 and the sensor 110 at a position inclined to the upper side of the sensor 110. Further, the second lateral projection 1705 may isolate the first extension part 33 and the sensor 110 at a position inclined to the lower side of the sensor 110.

The first lateral projection 1785 and the second lateral projection 1705 can prevent the sensor 110 from being overheated by the influence of a high temperature part of the rear panel 30, and thus can prevent a malfunction and the deterioration of reliability of the sensor 110.

Furthermore, the first lateral projection 1785 and the second lateral projection 1705, in particular, the first lateral projection 1785 may also play a role of preventing the first extension part 33 and the supporter 160 from coming into contact with each other by isolating the first extension part 33 and the supporter 160 at a given interval or more.

That is, the first lateral projection 1785 and the second lateral projection 1705 can provide effects in that a change in the posture of the supporter 160 can be smoothly performed without being hindered by the rear panel 30 by preventing the first extension part 33 and the supporter 160 from coming into contact with each other and thus operation reliability of the first sensing module can be improved.

[Actions and Effects of First Sensing Module]

Figure 24:
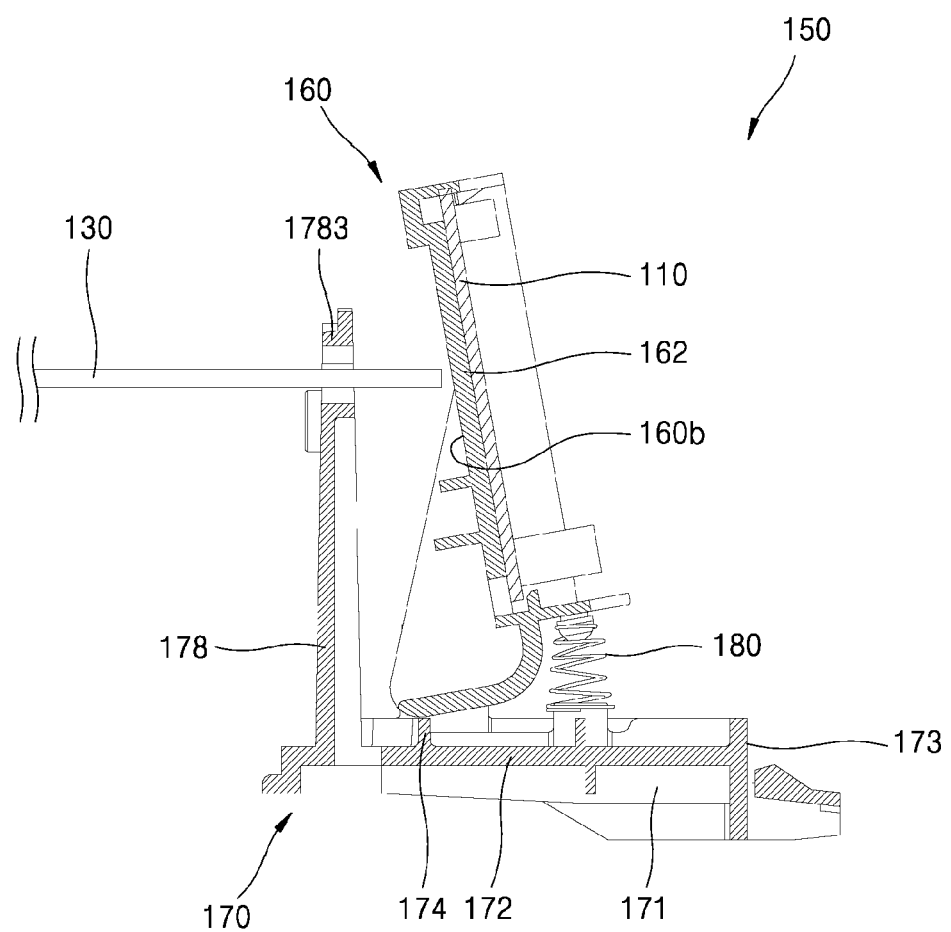
FIG. 24 is a side cross-sectional view illustrating a structure of the supporter assembly according to an embodiment of the present disclosure.
Figure 25:
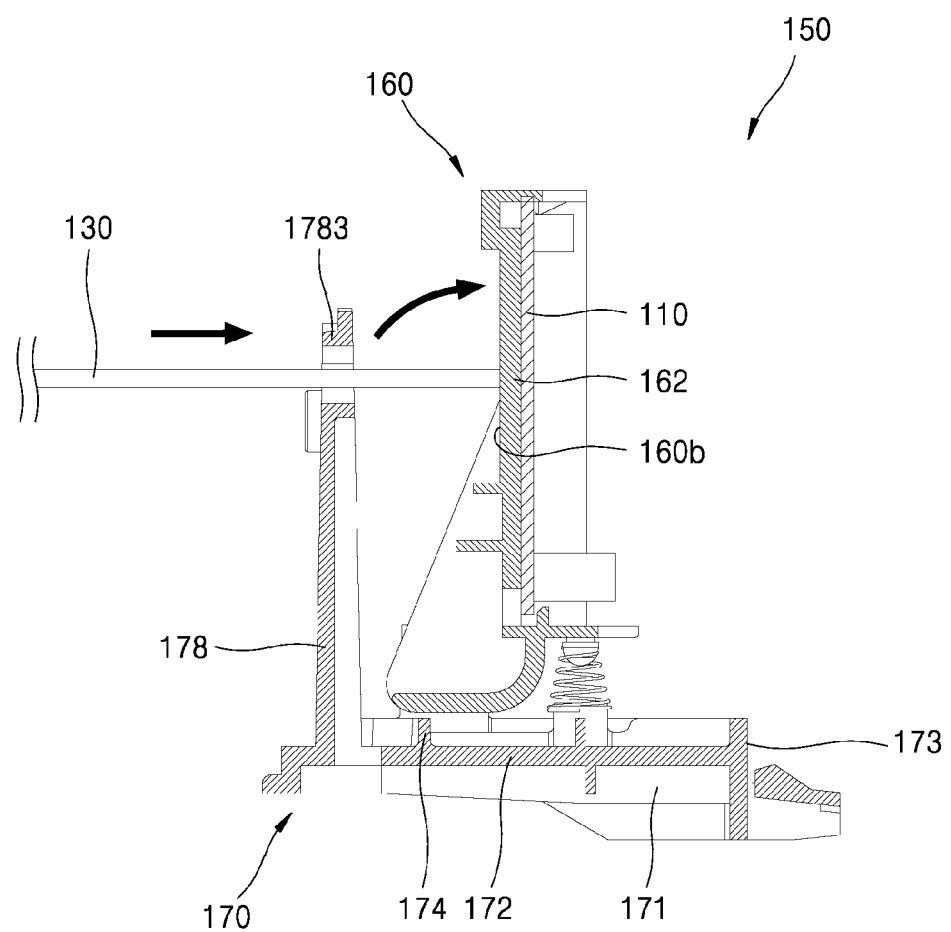
FIG. 25 is a side cross-sectional view illustrating the state of a change in the posture of the supporter illustrated in FIG. 24.
Figure 26:
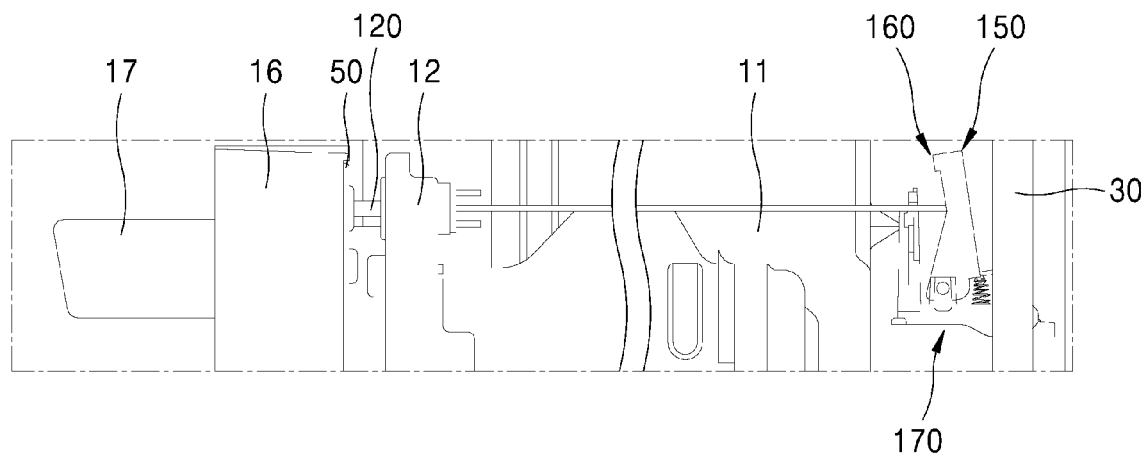
FIG. 26 is a diagram illustrating the state of the first sensing module in a door close state.
Figure 27:
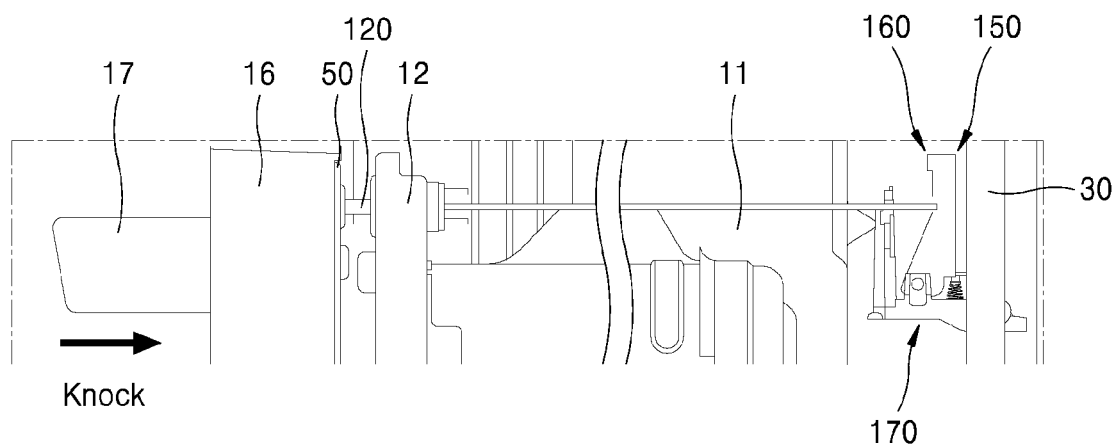
FIG. 27 is a diagram illustrating the state of the first sensing module upon knock operation.

FIG. 24 is a side cross-sectional view illustrating a structure of the supporter assembly according to an embodiment of the present disclosure. FIG. 25 is a side cross-sectional view illustrating the state of a change in the posture of the supporter illustrated in FIG. 24. FIG. 26 is a diagram illustrating the state of the first sensing module in a door close state. FIG. 27 is a diagram illustrating the state of the first sensing module upon knock operation.

Hereafter, the operation and effect of the first sensing module provided in the appliance of one embodiment are described.

Referring to FIGS. 24 to 25, the first sensing module 100 may include a sensor 110, an input switch 120, a transfer member 130 and a support assembly 150.

The support assembly 150 may be disposed at the rear of the main body 10, and the sensor 110 may be supported by the support assembly 150 and disposed at the rear of the main body 10.

The input switch 120 may be disposed at the front of the cavity 11. The input switch 120 may be disposed on the front panel 12, and at least a portion of the input switch 120 may be disposed between the front panel 12 and the door 16 and exposed toward the door 16.

The transfer member 130 may connect between the input switch 120 and the sensor 110. The transfer member 130 may connect to the input switch 120, at the front of the cavity 11, and connect to the supporter 160, at the front of the cavity 11.

The transfer member 130 may connect to the moving member 123 and move in the front-rear direction along the moving member 123. The transfer member 130 may connect to the supporter 160 while contacting the front surface of the supporter 160. The supporter 160 may be pushed by the moving member 123 having moved rearward and rotate rearward, and rotate forward by using elastic force provided by the second elastic member 180.

The moving member 123 may move rearward while being slightly pressed by the door 16 as the door 16 closes a cooking space 15 (see FIG. 2). The transfer member 130 may move rearward together with the moving member 123. The transfer member 130 may move to a position where the transfer member 130 contacts the supporter 160. The elastic force provided by the second elastic member 180 may keep the supporter 160 contacting the transfer member 130 reliably.

In the embodiment, the transfer member 130 is formed into a rod, for example. Preferably, the transfer member 130 may be formed into a rod having a rigid body that does not bring about vibration damping.

Since the transfer member 130 is formed into a rod having a rigid body, the supporter 160 may be kept contacting the rod 130 reliably.

As a knock is input to the door 16 as illustrated in FIGS. 26 to 27, the vibrations input to the door 16 is transmitted to the supporter 160 through the moving member 123 and the transfer member 130.

Accordingly, the supporter 160 may rotate rearward, and the sensor 110 may move rearward together with the supporter 160 rotating rearward. In this process, the sensor 110 may sense vibrations transferred to the supporter 160.

The sensor 110 may determine whether the vibrations sensed by the sensor 110 are caused by a knock input by the user. When determining that the vibrations are caused by a knock input by the user, the sensor 110, as illustrated in FIGS. 2 to 4, may output information on the determination in the form of a first signal and transmit the first signal to the controller 200.

In an example, the transfer member 130 may be formed into a rod. Preferably, the transfer member 130 may be formed into a rod having a rigid body that does not bring about vibration damping.

Since the transfer member 130 is formed into a rod having a rigid body as described above, the supporter 160 and the rod 130 may be kept contacting each other reliably.

In another example, the input switch 120 may be provided in the form of a switch that controls electric currents, and the transfer member 130 may be provided in the form of an electric wire that electrically connects between the input switch 120 and the sensor 110.

For example, as the door 16 is closed, the input switch 120 is turned on, and the input switch 120 and the sensor 110 electrically connect to each other. As the door 16 is opened, the input switch 120 is turned off, and the input switch 120 and the sensor 110 electrically disconnect from each other.

As the input switch 120 and the sensor 110 electrically connect, the sensor 110 may be supplied with electricity and operate. As the input switch 120 electrically disconnects from the sensor 110, the supply of electricity to the sensor 110 may be disconnected and the sensor 110 may not operate.

Accordingly, depending on the opening and closing of the door 16, the operation of the sensor 110 may be determined electrically.

At this time, vibrations input to the input switch 120 may be transferred to the sensor 110 immediately by the transfer member 130 in the form of an electric wire.

In another example, vibrations input by a knock may be transferred through the door 16 to which a knock is input, the main body 10 in which the second sensing module 100 is installed, and a medium constituting the components between the door 16 and the main body 10.

In yet another embodiment, a transfer member 130 in the form of an electric wire, and a transfer member 130 in the form of a rod may be provided together. At this time, the operation of the sensor 110 may be determined by the transfer member 130 in the form of an electric wire, and vibrations may be transferred to the supporter 160 by the transfer member 130 in the form of a rod.

Having received a first signal transmitted by the sensor 110, the controller 200 may control the operation of the lamp 70, based on the first signal.

The above-mentioned operation may be provided as a knock-on function. For example, as the user touches a knock-on button displayed on the input part 21 of the display part once, the knock-on function may be turned on, and as the user touches the knock-on button once again, the knock-on function may be turned off.

The knock-on function allows the lamp 70 to be turned on/off based on the user's knock motion. That is, in the state in which the knock-on function is on, the lamp 70 may be automatically on/off, based on the user's knock-on motion. In the state in which the knock-on function is off, the lamp 70 may not be automatically on/off even if the user's knock is input.

If the user wants to use the knock-on function, the user may turn on the knock-on function, and if not, the user may turn off the knock-on function.

Additionally, a lamp button displayed on the input part 21 of the display part is used to manually turn on/off the lamp 70 regardless of the user's knock motion. That is, as the user touches the lamp button displayed on the input part 21 of the display part once, the lamp 70 is turned on, and as the user touches the lamp button once again, the lamp 70 is turned off.

In the state in which the lamp 70 is on at the touch of the lamp button, the lamp 70 is not turned off even if a knock is input. That is, in the state in which the lamp 70 is on as the user touches the lamp button manually, the knock-on function is not performed.

This is because the user cannot perform intended work if the user turns off the lamp 70 because a knock is input, while the user manually turns on the lamp 70 and looks into the appliance. However, in the state in which the lamp 70 is off as the user touches the lamp button, the knock-on function can be performed such that the user's knock motion allows the lamp 70 to be turned on/off.

In another example, a self-cleaning button may be displayed on the input part 22 of the display part. Self-cleaning may involve automatically sterilizing and cleaning the cooking space 15 itself, and the like. During self-cleaning, the operation of the appliance may be set such that the knock-on function cannot be performed. At this time, despite the user's knock motion, the lamp 70 is not turned on/off.

During the self-cleaning operation, the temperature of the cooking space 15 remains very high. As the lamp 70 is turned on in this state, the lamp 70 is likely to be broken due to high-temperature heat. Considering the fact, in the embodiment, the operation of the appliance may be set such that knock-on function cannot be performed during the self-cleaning procedure.

The first sensing module in the embodiment may provide the function sensing the opening of the door 16.

As the door 16 is opened, the supporter 160 and the transfer member 130 do not contact each other, and accordingly, the sensor 110 may not sense a knock normally. That is, when the door 16 is opened, even if the user knocks at the door 16, vibrations caused by the knock may not be transferred to the supporter 160 through the transfer member 130, and the sensor 110 may not sense the knock normally.

Considering the fact, when the sensor 110 senses vibrations, it means that the closing of the door 16 is a prerequisite. That is, the closing of the door 16 may be sensed based on the vibrations sensed by the sensor 110.

Accordingly, the appliance in the embodiment may use the first sensing module 100 provided with the sensor 110 sensing vibrations, to sense whether the door 16 is closed mechanically, without an additional module.

Referring to FIGS. 2 to 6 the first accommodation space is disposed at the inside of the main body 10 in the left-right direction and at the inside of the main body 10 in the up-down direction. The first sensing module 100 in the embodiment may be installed in the main body 10 in a way that the first sensing module 100 is disposed in the first accommodation space, i.e., outside the cooking space 15.

For example, the first sensing module 100 may be disposed at the edge of the left side of the main body 10 in a way that the first sensing module 100 is biased toward the upper side and the left side of the cooking space 15.

The input switch 120 disposed at the frontmost side of the first sensing module 100 may be disposed on the front panel 12. The input switch 120 may be disposed at the edge of the left side of the front panel 12.

The transfer member 130 connecting to the input switch 120 may pass through the second accommodation space and connect to the sensor 110. In the first unit 1, the transfer member 130 may be disposed to pass through the component room 30. The transfer member 130 may be disposed outside the area where electronic components are disposed, in the left-right direction.

For example, the transfer member 130 may be disposed to pass through the second accommodation space, i.e., a space between the end portion of the left side of the cavity 11 and the area where electronic components are disposed in the component room 30, in the front-rear direction.

If the transfer member 130 escapes from the above-described area and passes through the area where electronic components are disposed, this area becomes complex due to large number of components, and the transfer 130 and the electronic components are highly likely to interfere with one another. Since the transfer member 130 moves in the front-rear direction, when the transfer member 130 passes through the area where electronic components are disposed, the electronic components are highly likely to be broken by the transfer member 130.

Considering the fact, the transfer member 130 is disposed to avoid the area where electronic components are disposed and to pass through the space between the end portion of the right side of the cavity 11 and the area where electronic components are disposed, in the embodiment.

Further, considering that the input switch 120 is disposed between the end portion of the left side of the front panel 12, disposed at the front of the second accommodation space, and the suction opening 13, i.e., the input switch 120 is biased toward the left side of the main body 10, the transfer member 130 connecting to the input switch 120 is also biased toward the left side of the main body 10, preferably.

In the embodiment, since the transfer member 130 is disposed as described above, the above-mentioned problems may be prevented, and vibrations transferred to the input switch 120 may be reliably transferred to the sensor 110 by the transfer member 130.

Additionally, the appliance may further include a heating part, i.e., an upper burner 19 disposed in the upper portion of the first accommodation space. The upper burner 19 may be disposed close to the upper surface of the cooking space 15 while being disposed in the first accommodation space, i.e., in the cooking space 15.

In the embodiment, the first sensing module 100 may be disposed between the end portion of one side of the main body 10 in the left-right direction thereof and the heating part. Specifically, the first sensing module 100 may be disposed between the end portion of the left side of the main body 10 and the upper burner 19.

The cavity 11 may include a burner accommodation part that is depressed upward from the upper surface of the cavity 11. When viewed from the inside of the cooking space 15, the burner accommodation part may be depressed upward from the upper surface of the cavity 11. The burner accommodation part may accommodate at least a portion of the heating part, i.e., the upper burner 19.

The outside of the cooking space 15, i.e., the burner accommodation part, when viewed from the second accommodation space, may be formed convexly from the upper surface of the cavity 11 toward the second accommodation space, i.e., in the upward direction. The transfer member 130 may be disposed outside the burner accommodation part in the left-right direction thereof, while being disposed in the second accommodation space.

The transfer member 130 may connect between the input switch 120 and the sensor 110 while passing through a space between the end portion of the left side of the cavity 11 and the burner accommodation part, in the front-rear direction, in the second accommodation space.

Since the transfer member 130 in the embodiment is disposed as described above, the above-mentioned problems may be prevented. Additionally, since the transfer member 130 is disposed as described above, the effect of heat generated by the heating part on the transfer member 130 may be effectively suppressed.

For example, when the transfer member 130 is disposed near the heating part, the transfer member 130 may be deformed due to heat generated by the heating part. At this time, the transfer member 130 may not connect between the input switch 120 and the sensor 110 properly, and accordingly, vibrations may not be properly transferred to the sensor 110.

In the embodiment, since the transfer member 130 is disposed in the space between the end portion of the left side of the main body 10 and the burner accommodation part, the transfer member may be disposed far from the heating part. Thus, heat generated by the heating part hardly affects the transfer member 130, and vibrations transferred to the input switch 120 may be reliably transferred to the sensor 110 by the transfer member 130.

Furthermore, the sensor 110 may receive the vibration of a knock through the input switch 120 that is disposed at a position close to a point at which the knock is input and the transfer member 130 that is connected to the input switch 120. Accordingly, the appliance of the present embodiment can provide effects in that it can effectively sense a knock input even in an appliance in which it is difficult to attach the sensor to the door due to high heat, such as an oven, can reduce the influence of heat that affects the sensor, and can improve the accuracy of the sensing of the sensor.

Furthermore, the transfer member 130 that transfers, to the sensor 110, the vibration transferred to the input switch 120 as described above passes through the second accommodation space and connects the input switch 120 and the sensor 110, but may be disposed in an area in which electronic parts are installed, an area that belongs to the top surface of the cavity 11 and that convexly protrudes over the second accommodation space in order to accommodate the heating part, that is, on the end side of the second accommodation space in the left-right direction thereof.

The transfer member 130 may be installed in the appliance without being influenced by electronic parts installed in the appliance or affecting the electronic parts. Accordingly, the appliance of the present embodiment can provide an effect in that a knock input can be effectively sensed without being influenced by electronic parts installed in the appliance or affecting the electronic parts.

The embodiments are described above with reference to a number of illustrative embodiments thereof. However, the embodiments set forth herein are provided only as examples, and numerous other modifications and embodiments can be devised by one skilled in the art from the embodiments set forth herein. The technical protection scope of the disclosure should be defined according to the appended claims.

DESCRIPTION OF REFERENCE NUMERALS

1: First unit
2: Second unit
10: Main body
11: Cavity
12: Front panel
13: Suction opening
14: Opening part
15: Cooking space
16: Door
16a: See-through window
17: Handle
18: Convection part
19: Upper burner 20: Control panel
40: Cabinet
50: Contactor
70: Lamp
80: Second sensing module
90: Cover bracket
92: Discharge opening
94: Rod passage hole
100: First sensor module
110: Sensor
111: Three axes sensor module
113: Sensor micom
115: Filter part
117: Amplification part
120: Input switch
121: Switch holder
123: Moving member
125: First elastic member
127: Support cover
130: Transfer member
150: Support assembly
160: Supporter
160a: Second spring support part
160b: Contact surface
161: Sensor support part
162: Rear support surface
163a,163b,163c: Side wall
163d: Slit part
163e: Extension part
163f: Protruding surface part
164a: First fastening projection
164b: Second fastening projection
165: Rotation support part
166a: First leg part
166b: Second leg part
167: Rotation projection
168: Side support surface
169: Side rib
170: Supporter holder
171: Holder main body
172: Support surface
173: Coupling surface
174: Upper rib
175: Rotation projection supporter
177: First spring support part
180: Second elastic member
200: Controller What claimed is:

1. An appliance comprising:
a main body having an accommodation space;
a door configured to open and close the accommodation space; and
a sensing module configured to sense a vibration of the door, wherein the sensing module comprises:
a transfer member installed on the main body to be movable in response to the vibration of the door;
a sensor configured to sense the vibration from the transfer member; and
a support assembly movably supporting the sensor on the main body,
wherein the sensor is moved by the transfer member that moves in response to vibration of the door, and is configured to sense the vibration from the transfer member based on the sensor's positional change.

2. The appliance of claim 1, wherein the main body comprising:
a cavity forming an accommodation space therein;
a rear panel disposed at a rear side of the cavity, and
a cabinet to cover a side of the cavity on an outside thereof,
wherein the transfer member is surrounded by the side of the cavity, the rear panel, and the cabinet.

3. The appliance of claim 2, wherein the support assembly is coupled to the rear panel or the cavity.

4. The appliance of claim 2, wherein:
the support assembly comprises a supporter to support the sensor and a supporter holder to support the supporter such that the supporter is changeable in posture,
the supporter is connected to the transfer member, and
the supporter holder is coupled to the rear panel or the cavity.

5. The appliance of claim 1, wherein the support assembly comprises:
a supporter to support the sensor; and
a supporter holder to support the supporter such that the supporter is changeable in posture,
wherein a position of the sensor in a front-rear direction thereof changes in conjunction with a change in the posture of the supporter.

6. The appliance of claim 5, wherein the supporter holder comprises:
a holder main body coupled to a rear of the main body and disposed at a lower side of the supporter; and
a plurality of rotation projection supports each protruding upward from the holder main body and configured to rotatably support the supporter.

7. The appliance of claim 5, wherein the supporter holder further comprises;
a holder main body coupled with the main body, the holder main body is disposed on a lower side of the supporter; and
a front wall that protrudes upward from the holder main body and is disposed at a front side of the supporter.

8. The appliance of claim 7, wherein:
the supporter holder further comprises a load support part that protrudes from the front wall and is disposed along a moving path of the transfer member, and
the transfer member is supported in the load support part such that it is movable.

9. The appliance of claim 8, wherein:
a passage hole is provided in the load support part and penetrates the load support part, and
the transfer member passes through the passage hole.

10. The appliance of claim 7, wherein:
the sensing module further comprises a harness connected to the sensor,
the supporter holder further comprises a harness support part to support the harness and to regulate positions of the harness in a lateral direction and an up-down direction thereof, and
the harness is moveably supported in the harness support.

11. The appliance of claim 10, wherein the harness support part protrudes in a lateral direction thereof from the front wall and is disposed at a height that is higher than a height of the connection portion of the sensor and the harness.

12. The appliance of claim 1, wherein the main body comprising:
a cavity forming an accommodation space therein;
a rear panel disposed at a rear side of the cavity, wherein the support assembly is disposed on the rear panel.

13. The appliance of claim 12, wherein the rear panel comprises:
a panel main body part that forms a plane parallel to a rear surface of the cavity;
a first extension part that extends from an end of the panel main body part in a lateral direction thereof to a rear side thereof; and
a second extension part that extends in a lateral direction thereof from an end of the first extension part on a rear side thereof and extends in a direction from the panel main body part,
wherein the support assembly is surrounded by the first extension part and the second extension part.

14. The appliance of claim 13, wherein:
the support assembly comprises a supporter to support the sensor, and a supporter holder to support the supporter such that the supporter is changeable in posture,
the supporter holder comprises a lateral projection that protrudes from the supporter holder to the first extension part, and
at least a portion of the lateral projection is disposed between the first extension part and the supporter in a lateral direction of the supporter holder.

15. The appliance of claim 13, wherein:
the support assembly comprises a supporter to support the sensor, and a supporter holder to support the supporter such that the supporter is changeable in posture, and
the supporter holder is coupled to the first extension part.

16. The appliance of claim 15, wherein:
a first fastening hole and a second fastening hole are provided in the first extension part each of the first and second fastening holes penetrating the first extension part back and forth,
the supporter holder further comprises a fastening projection that protrudes from the holder main body to a rear side thereof, and
whereby the fastening projection is received into the first extension part through the first fastening hole.

17. The appliance of claim 1, wherein the main body comprising:
a cavity forming an accommodation space therein;
a front panel disposed between the cavity and the door to support the input member, wherein the front panel provides, in front of the cavity, a surface that closes the accommodation space and faces the door.

18. The appliance of claim 1, further comprising a contactor that includes at least a portion thereof that is disposed between the main body and the door, wherein the contactor receives the vibration input of the door.

19. The appliance of claim 18, further comprising a support body received in the contactor, wherein at least a portion of the contactor is disposed between the input member and the support body.

* * * * *